US009374805B2

(12) United States Patent
Julia et al.

(10) Patent No.: US 9,374,805 B2
(45) **Date of Patent: *Jun. 21, 2016**

(54) SYSTEM AND METHOD FOR COMBINING MEMORY RESOURCES FOR USE ON A PERSONAL NETWORK

(71) Applicant: QUALCOMM Incorporated, San Deigo, CA (US)

(72) Inventors: Luc E. Julia, Oakland, CA (US); Maklouf Serghine, Oakland, CA (US); Johan Le Nerriec, Palo Alto, CA (US); Jehan G. Bing, Menlo Park, CA (US); Jerome Dubreuil, San Francisco, CA (US)

(73) Assignee: QUALCOMM ATHEROS, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/721,958

(22) Filed: May 26, 2015

(65) Prior Publication Data

US 2015/0257128 A1 Sep. 10, 2015

Related U.S. Application Data

(63) Continuation of application No. 10/888,633, filed on Jul. 9, 2004, now Pat. No. 9,077,766.

(51) Int. Cl.
*H04W 72/00* (2009.01)
*H04L 29/06* (2006.01)
(Continued)

(52) U.S. Cl.
CPC ......... *H04W 72/005* (2013.01); *H04B 7/18513* (2013.01); *H04L 67/1076* (2013.01);
(Continued)

(58) Field of Classification Search
CPC .......... H04W 72/005; H04W 67/1067; H04W 67/1078; H04B 7/18513
USPC .......................................... 455/3.02; 370/313
See application file for complete search history.

(56) References Cited

U.S. PATENT DOCUMENTS 5,034,807 A 7/1991 Von Kohorn
5,132,992 A 7/1992 Yurt et al.
(Continued)

FOREIGN PATENT DOCUMENTS

WO WO-0013688 A1 3/2000
WO WO-0131852 A1 5/2001
(Continued)

OTHER PUBLICATIONS

Citrix, Winview for Networks, Installation Guide. 320pages, 1990-1994.

(Continued)

*Primary Examiner* — Hai V Nguyen
(74) *Attorney, Agent, or Firm* — Paradice and Li LLP

(57) ABSTRACT

A personal network may be established by interconnecting a plurality of satellites as part of the personal network. Each satellite may be configured to communicate with one or more other satellites. On any given one of the plurality of satellites, data indicating a connectivity status for the one or more other satellites is automatically received, and information indicating a capability of the one or more other satellites is automatically received. The given satellite may be configured to enable at least one other corresponding satellite in the plurality of satellites to be made available for use, so that a capability of the at least one other corresponding satellite is made available for the given satellite.

20 Claims, 17 Drawing Sheets

(51) Int. Cl.
*H04B 7/185* (2006.01)
*H04L 12/28* (2006.01)
*H04L 29/12* (2006.01)
*H04L 29/08* (2006.01)

(52) U.S. Cl.
CPC .......... *H04L67/1078* (2013.01); *H04L 67/303* (2013.01); *H04L 69/24* (2013.01); *H04L 12/2803* (2013.01); *H04L 29/12113* (2013.01); *H04L 61/1541* (2013.01); *H04L 67/104* (2013.01); *H04L 67/1046* (2013.01); *H04L 67/1048* (2013.01); *H04L 67/1068* (2013.01)

(56) References Cited

U.S. PATENT DOCUMENTS 5,253,275 A 10/1993 Yurt et al.
5,339,392 A * 8/1994 Risberg ................. G06F 3/0481 715/255
5,550,863 A 8/1996 Yurt et al.
5,661,516 A 8/1997 Carles
5,719,786 A 2/1998 Nelson et al.
5,774,170 A 6/1998 Hite et al.
5,831,664 A 11/1998 Wharton et al.
5,966,653 A 10/1999 Joensuu et al.
6,002,720 A 12/1999 Yurt et al.
6,101,534 A 8/2000 Rothschild
6,144,702 A 11/2000 Yurt et al.
6,157,621 A 12/2000 Brown et al.
6,157,719 A * 12/2000 Wasilewski ............. H04L 63/04 348/E5.004
6,161,133 A 12/2000 Kikinis
6,209,132 B1 3/2001 Harrison et al.
6,212,282 B1 4/2001 Mershon
6,263,503 B1 7/2001 Margulis
6,263,505 B1 7/2001 Walker et al.
6,310,886 B1 10/2001 Barton
6,312,336 B1 11/2001 Handelman et al.
6,327,608 B1 12/2001 Dillingham
6,349,410 B1 2/2002 Lortz
6,424,998 B2 7/2002 Hunter
6,430,603 B2 8/2002 Hunter
6,430,605 B2 8/2002 Hunter
6,437,836 B1 8/2002 Huang et al.
6,445,682 B1 * 9/2002 Weitz .................. H04L 12/2856 370/257
6,466,203 B2 10/2002 Van
6,466,971 B1 10/2002 Humpleman et al.
6,470,378 B1 10/2002 Tracton et al.
6,477,589 B1 11/2002 Suzuki et al.
6,496,122 B2 12/2002 Sampsell
6,545,722 B1 4/2003 Schultheiss et al.
6,567,984 B1 5/2003 Allport
6,605,038 B1 8/2003 Teller et al.
6,611,863 B1 8/2003 Banginwar
6,629,163 B1 9/2003 Balassanian
6,658,461 B1 12/2003 Mazo
6,670,974 B1 12/2003 McKinght et al.
6,718,551 B1 4/2004 Swix et al.
6,721,705 B2 4/2004 Kurganov et al.
6,742,022 B1 5/2004 King et al.
6,754,904 B1 6/2004 Cooper et al.
6,754,907 B1 6/2004 Schumacher et al.
6,757,684 B2 6/2004 Svendsen et al.
6,757,906 B1 6/2004 Look et al.
6,763,226 B1 7/2004 McZeal, Jr.
6,825,858 B2 11/2004 Sato
6,826,589 B2 11/2004 Berrada
6,834,312 B2 * 12/2004 Edwards ................. H04L 29/06 709/231
6,836,786 B1 12/2004 Zoller et al.
6,850,495 B1 * 2/2005 Baum ................. H04L 12/4641 370/256
6,870,547 B1 3/2005 Crosby et al.
6,904,265 B1 6/2005 Valdivia et al.
6,928,490 B1 8/2005 Bucholz et al.
6,956,833 B1 10/2005 Yukie et al.
6,957,086 B2 10/2005 Bahl et al.
6,959,235 B1 10/2005 Abdel-Malek Aiman et al.
6,968,179 B1 11/2005 De
6,975,836 B2 12/2005 Tashiro et al.
7,010,002 B2 3/2006 Chow et al.
7,065,778 B1 6/2006 Lu
7,072,388 B2 7/2006 Blakeney et al.
7,089,066 B2 8/2006 Hesse et al.
7,098,772 B2 8/2006 Cohen
7,103,017 B2 * 9/2006 Gutman ............. H04B 7/18582 370/316
7,127,261 B2 10/2006 Van
7,130,582 B2 10/2006 Barilovits
7,139,834 B1 11/2006 Albanese et al.
7,165,224 B2 1/2007 Pyhalammi
7,177,872 B2 2/2007 Schwesig et al.
7,177,881 B2 2/2007 Schwesig et al.
7,188,312 B2 3/2007 Hsiu-Ping Lin et al.
7,209,817 B2 4/2007 Abdel-Malek Aiman et al.
7,213,061 B1 5/2007 Hite et al
7,213,766 B2 5/2007 Ryan et al.
7,219,136 B1 5/2007 Danner et al.
7,233,990 B1 6/2007 Debaty et al.
7,246,009 B2 7/2007 Hamblen et al.
7,260,600 B1 8/2007 Dunn et al.
7,263,352 B2 8/2007 Neuhaus et al.
7,271,780 B2 9/2007 Cok
7,275,063 B2 9/2007 Horn
7,280,533 B2 10/2007 Khartabil et al.
7,284,046 B1 10/2007 Kreiner et al.
7,292,588 B2 11/2007 Milley et al.
7,302,490 B1 11/2007 Gupta et al.
7,310,680 B1 12/2007 Graham
7,325,057 B2 1/2008 Cho et al.
7,328,173 B2 2/2008 Taratino et al.
7,349,344 B1 * 3/2008 Hogg .................. H04L 12/2697 370/241
7,360,087 B2 4/2008 Jorgensen et al.
7,363,258 B2 4/2008 Svendsen et al.
7,376,696 B2 * 5/2008 Bell ...................... G06F 3/0486 709/203
7,376,901 B2 5/2008 Shen et al.
7,379,464 B2 * 5/2008 Kreiner ............... H04L 12/2856 370/401
7,379,986 B2 5/2008 Kikinis
7,468,744 B2 12/2008 Edwards et al.
7,474,667 B2 * 1/2009 Kreiner ............... H04L 12/2803 370/389
7,483,964 B1 1/2009 Jackson et al.
7,486,926 B2 * 2/2009 White ................ G06Q 30/0267 455/3.05
7,487,112 B2 2/2009 Barnes et al.
7,502,795 B1 3/2009 Svendsen et al.
7,516,188 B2 * 4/2009 Morris .............. H04L 29/06027 709/208
7,519,393 B2 4/2009 Bahl et al.
7,526,314 B2 4/2009 Kennedy
7,535,492 B2 * 5/2009 Kahn ................. H04N 1/00132 348/14.02
7,561,299 B2 7/2009 Elarde et al.
7,565,547 B2 7/2009 Matta et al.
7,567,987 B2 7/2009 Shappell et al.
7,574,453 B2 * 8/2009 Julia ................. G06F 17/30746
7,617,279 B2 11/2009 Nakajima et al.
7,724,281 B2 5/2010 Vale et al.
7,746,851 B2 * 6/2010 Chandrasiri ........ H04L 65/1016 370/389
7,760,657 B1 * 7/2010 Hogg .................. H04L 12/2697 370/241
7,796,572 B2 9/2010 Do et al.
7,836,223 B2 * 11/2010 Butcher .............. H04L 12/2832 710/31
7,895,445 B1 2/2011 Albanese et al.
7,937,484 B2 * 5/2011 Julia .................. H04L 41/0806 709/203
7,957,357 B2 6/2011 Tysowski et al.
8,018,850 B2 9/2011 Van et al.

(56) References Cited

U.S. PATENT DOCUMENTS 8,028,096 B2 9/2011 Brune et al.
8,045,952 B2 10/2011 Qureshey et al.
8,050,652 B2 11/2011 Qureshey et al.
8,059,537 B2 11/2011 Karaoguz et al.
8,085,796 B2 * 12/2011 Kreiner ............... H04L 12/2856 370/401
8,169,481 B2 * 5/2012 Ozdemir ............ G06K 9/00335 348/143
8,190,883 B2 * 5/2012 Francis .............. G06Q 30/0269 709/230
8,190,884 B2 * 5/2012 Alroy ................. G06Q 30/0269 709/230
8,195,744 B2 * 6/2012 Julia .................. H04N 1/00127 709/205
8,195,765 B2 * 6/2012 Julia ................... H04L 41/0806 704/231
8,250,608 B2 * 8/2012 Hayes ................... G06F 1/1632 725/133
8,285,701 B2 * 10/2012 Swart ................. H04N 7/17318 707/709
8,326,879 B2 * 12/2012 Julia ................. G06F 17/30746 707/791
8,416,746 B2 * 4/2013 Fong ..................... H04L 63/162 370/332
8,543,665 B2 * 9/2013 Ansari ................... G06Q 30/04 709/218
8,706,886 B2 * 4/2014 Aiello ................... H04L 67/104 455/414.3
8,725,883 B2 * 5/2014 Noyranen ..................... 370/328
8,738,693 B2 * 5/2014 Julia .................. H04N 1/00137 709/204
8,738,730 B2 * 5/2014 Julia ................... H04L 41/0806 709/217
8,776,183 B2 * 7/2014 Chandrasiri ...... H04L 29/12009 370/254
8,787,164 B2 * 7/2014 Julia ................. G06F 17/30017 370/232
8,819,140 B2 * 8/2014 Julia ....................... H04L 67/16 370/328
8,826,183 B2 * 9/2014 Clauson ................ G06F 3/0482 715/810
8,973,072 B2 * 3/2015 Julia .................. H04N 7/17318 725/109
9,055,454 B2 * 6/2015 Fong ..................... H04L 63/162
9,071,796 B2 * 6/2015 McCausland .......... G11B 27/34
9,077,766 B2 * 7/2015 Julia ..................... H04L 67/303
9,166,879 B2 * 10/2015 Julia ....................... H04L 67/16
2001/0052019 A1 12/2001 Walters et al.
2001/0052942 A1 12/2001 MacCollum et al.
2001/0053274 A1 12/2001 Roelofs et al.
2002/0002707 A1 1/2002 Ekel et al.
2002/0010925 A1 1/2002 Kikinis
2002/0013852 A1 1/2002 Janik
2002/0026507 A1 2/2002 Sears et al.
2002/0041398 A1 4/2002 Ikeda et al.
2002/0046406 A1 4/2002 Chelehmal et al.
2002/0056112 A1 5/2002 Dureau et al.
2002/0059637 A1 5/2002 Rakib
2002/0069295 A1 * 6/2002 Edwards ................ H04L 29/06 709/246
2002/0069309 A1 6/2002 Balassanian
2002/0083342 A1 6/2002 Webb et al.
2002/0091848 A1 7/2002 Agresta et al.
2002/0100063 A1 7/2002 Herigstad et al.
2002/0101831 A1 * 8/2002 Gutman ............. H04B 7/18582 370/316
2002/0105534 A1 8/2002 Balassanian
2002/0108125 A1 8/2002 Joao
2002/0124258 A1 9/2002 Fritsch
2002/0124262 A1 * 9/2002 Basso ................ H04N 7/17336 725/109
2002/0131072 A1 9/2002 Jackson
2002/0142721 A1 10/2002 Souissi et al.
2002/0146237 A1 10/2002 Safadi
2002/0147686 A1 10/2002 Safadi et al.
2002/0162120 A1 10/2002 Mitchell
2002/0165006 A1 * 11/2002 Haller ...................... H04L 12/24 455/556.1
2002/0188556 A1 12/2002 Colica et al.
2002/0188867 A1 12/2002 Bushey et al.
2003/0009411 A1 * 1/2003 Ram ...................... G06Q 40/06 705/37
2003/0048295 A1 3/2003 Lilleness et al.
2003/0065407 A1 4/2003 Johnson et al.
2003/0065791 A1 4/2003 Garg et al.
2003/0093791 A1 5/2003 Julia et al.
2003/0093813 A1 5/2003 Shintani et al.
2003/0105831 A1 6/2003 O'Kane
2003/0105854 A1 6/2003 Thorsteinsson et al.
2003/0115284 A1 6/2003 Henry
2003/0118002 A1 * 6/2003 Bradd ............... H04L 29/12009 370/352
2003/0118014 A1 6/2003 Iyer et al.
2003/0149874 A1 8/2003 Balfanz et al.
2003/0165121 A1 * 9/2003 Leung ............... H04L 29/12009 370/313
2003/0192054 A1 10/2003 Birks et al.
2003/0200001 A1 10/2003 Goddard
2003/0208472 A1 11/2003 Pham
2003/0220835 A1 11/2003 Barnes
2003/0220995 A1 11/2003 Hitaka et al.
2003/0229667 A1 12/2003 Pedersen et al.
2004/0003097 A1 1/2004 Willis et al.
2004/0004663 A1 1/2004 Kahn et al.
2004/0004737 A1 1/2004 Kahn et al.
2004/0015589 A1 1/2004 Isozu
2004/0015820 A1 1/2004 Balassanian
2004/0044723 A1 * 3/2004 Bell ...................... G06F 3/0486 709/203
2004/0045039 A1 3/2004 Harrison et al.
2004/0049624 A1 3/2004 Salmonsen
2004/0060071 A1 3/2004 Shteyn
2004/0072584 A1 4/2004 Kern
2004/0088731 A1 5/2004 Putterman et al.
2004/0097259 A1 5/2004 Toor et al.
2004/0100974 A1 * 5/2004 Kreiner ............... H04L 12/2856 370/401
2004/0103313 A1 5/2004 Kreiner et al.
2004/0103437 A1 5/2004 Allegrezza et al.
2004/0117442 A1 6/2004 Thielen
2004/0117845 A1 6/2004 Karaoguz et al.
2004/0117846 A1 6/2004 Karaoguz et al.
2004/0117849 A1 6/2004 Karaoguz et al.
2004/0123316 A1 6/2004 Kendall et al.
2004/0133694 A1 7/2004 Karaoguz et al.
2004/0139172 A1 7/2004 Svendsen et al.
2004/0148353 A1 7/2004 Karaoguz et al.
2004/0192331 A1 9/2004 Gorday et al.
2004/0205168 A1 10/2004 Asher
2004/0236442 A1 11/2004 Maymudes
2004/0237122 A1 11/2004 Yamaguchi et al.
2004/0250205 A1 12/2004 Conning
2005/0002640 A1 1/2005 Putterman et al.
2005/0005025 A1 1/2005 Harville et al.
2005/0021624 A1 1/2005 Herf et al.
2005/0021915 A1 1/2005 Lowe et al.
2005/0028208 A1 2/2005 Ellis et al.
2005/0037706 A1 2/2005 Settle
2005/0038923 A1 2/2005 Kamataki
2005/0052469 A1 3/2005 Crosby et al.
2005/0055455 A1 3/2005 Asher
2005/0055716 A1 * 3/2005 Louie .................... G06F 1/1632 725/58
2005/0078620 A1 4/2005 Balachandran et al.
2005/0107031 A1 5/2005 Wood et al.
2005/0114490 A1 5/2005 Redlich et al.
2005/0120050 A1 * 6/2005 Myka ................ G06F 17/30067
2005/0120073 A1 6/2005 Cho
2005/0120391 A1 6/2005 Haynie et al.
2005/0136949 A1 6/2005 Barnes
2005/0138560 A1 6/2005 Lee et al.
2005/0153707 A1 7/2005 Ledyard et al.
2005/0172001 A1 8/2005 Zaner et al.
2005/0183120 A1 8/2005 Jain et al.

(56) References Cited

U.S. PATENT DOCUMENTS

2005/0198040 A1 9/2005 Cohen et al.
2005/0198222 A1 9/2005 Kohinata et al.
2005/0201358 A1 9/2005 Nelson et al.
2005/0201529 A1 9/2005 Nelson et al.
2005/0215194 A1 9/2005 Boling et al.
2005/0223409 A1 10/2005 Rautila et al.
2005/0229243 A1 10/2005 Svendsen et al.
2005/0232186 A1 10/2005 Karaoguz et al.
2005/0234864 A1 10/2005 Shapiro
2005/0235048 A1 10/2005 Costa-Requena et al.
2005/0235329 A1 10/2005 Karaoguz et al.
2005/0240558 A1 10/2005 Gil et al.
2005/0242971 A1 11/2005 Dryer
2005/0246757 A1 11/2005 Relan et al.
2005/0256934 A1 11/2005 Motoyama
2005/0259618 A1 11/2005 Ahya et al.
2005/0283731 A1 12/2005 Saint-Hilaire Yilan et al.
2005/0286497 A1 12/2005 Zutaut et al.
2005/0289266 A1 12/2005 Illowsky et al.
2006/0010225 A1 1/2006 Issa et al.
2006/0010255 A1 1/2006 Van et al.
2006/0010270 A1 1/2006 Zhang
2006/0015649 A1 1/2006 Zutaut et al.
2006/0015664 A1 1/2006 Zhang
2006/0020960 A1 1/2006 Relan et al.
2006/0036354 A1 2/2006 Maekawa et al.
2006/0041678 A1* 2/2006 Morris .................... H04L 67/14 709/236
2006/0047843 A1 3/2006 Julia et al.
2006/0085826 A1 4/2006 Funk et al.
2006/0092176 A1 5/2006 Wang et al.
2006/0095401 A1 5/2006 Krikorian et al.
2006/0095471 A1 5/2006 Krikorian et al.
2006/0095472 A1 5/2006 Krikorian et al.
2006/0161635 A1 7/2006 Lamkin et al.
2006/0167985 A1 7/2006 Albanese et al.
2006/0238335 A1 10/2006 Karaoguz et al.
2006/0248554 A1 11/2006 Priddy
2006/0253542 A1 11/2006 McCausland et al.
2006/0253894 A1 11/2006 Bookman et al.
2006/0256130 A1 11/2006 Gonzalez
2006/0268738 A1 11/2006 Goerke et al.
2006/0277318 A1 12/2006 Julia et al.
2006/0280157 A1 12/2006 Karaoguz et al.
2006/0288095 A1 12/2006 Torok et al.
2007/0027957 A1 2/2007 Peters et al.
2007/0061857 A1 3/2007 Seki et al.
2007/0067407 A1 3/2007 Bettis et al.
2007/0101011 A1 5/2007 Mrsic-Flogel Janko et al.
2007/0109974 A1* 5/2007 Cutillo ................ H04L 12/2856 370/254
2007/0113258 A1* 5/2007 Earle .................. H04N 7/17318 725/131
2007/0118535 A1 5/2007 Schwesig et al.
2007/0118619 A1 5/2007 Schwesig et al.
2007/0149116 A1* 6/2007 White ................ G06Q 30/0267 455/3.06
2007/0168543 A1 7/2007 Krikorian et al.
2007/0173266 A1 7/2007 Barnes, Jr. et al.
2007/0189476 A1 8/2007 Marsico et al.
2007/0198532 A1 8/2007 Krikorian et al.
2007/0207755 A1* 9/2007 Julia .................. H04N 1/00127 455/217
2007/0213980 A1 9/2007 Danner et al.
2007/0243860 A1* 10/2007 Aiello ................... H04L 67/104 455/414.3
2007/0255785 A1 11/2007 Hayashi et al.
2007/0260604 A1 11/2007 Haeuser et al.
2007/0266169 A1 11/2007 Chen et al.
2007/0280138 A1 12/2007 Stern
2007/0294334 A1 12/2007 Hickman
2008/0021921 A1 1/2008 Horn
2008/0103975 A1 5/2008 Taratino et al.
2008/0127289 A1* 5/2008 Julia .................. H04N 7/17318 725/109
2008/0189766 A1 8/2008 Bell et al.
2008/0232295 A1* 9/2008 Kreiner ............... H04L 12/2856 370/313
2008/0259818 A1* 10/2008 Balassanian ........ H04L 12/2832 370/254
2008/0279098 A1 11/2008 Park
2009/0013095 A1* 1/2009 Butcher .............. H04L 12/2832 710/11
2009/0063217 A1* 3/2009 Barros ................... G06Q 10/06 705/7.12
2009/0119384 A1* 5/2009 Kreiner ............... H04L 12/2803 709/206
2009/0271380 A1* 10/2009 Julia ................. G06F 17/30746
2009/0276705 A1* 11/2009 Ozdemir ............ G06K 9/00771 715/708
2010/0017462 A1 1/2010 Thoen
2010/0180307 A1* 7/2010 Hayes ................... G06F 1/1632 725/51
2010/0186034 A1* 7/2010 Walker ............... H04N 21/4334 725/40
2010/0217837 A1* 8/2010 Ansari ................... G06Q 30/04 709/218
2012/0158917 A1 6/2012 Julia et al.
2012/0198499 A1* 8/2012 Louie .................... G06F 1/1632 725/60
2012/0330889 A1* 12/2012 Swart ................. H04N 7/17318 707/610
2013/0086466 A1 4/2013 Levy et al.
2014/0109144 A1* 4/2014 Asnis ............... H04N 21/43615 725/48
2014/0222944 A1 8/2014 Julia et al.
2014/0240525 A1 8/2014 Julia et al.
2014/0258514 A1 9/2014 Julia et al.
2014/0330950 A1 11/2014 Julia et al.

FOREIGN PATENT DOCUMENTS

WO WO-0133839 A1 5/2001
WO WO-03052552 A2 6/2003
WO WO-2005122025 A2 12/2005
WO WO-2006010023 1/2006

OTHER PUBLICATIONS

Co-pending U.S. Appl. No. 09/304,973, filed May 4, 1999.
Co-pending U.S. Appl. No. 09/498,016, filed Feb. 4, 2000.
Co-pending U.S. Appl. No. 10/118,587, filed Apr. 8, 2002.
Co-pending U.S. Appl. No. 11/325,797, filed Jan. 3, 2006.
Co-pending U.S. Appl. No. 60/341,574, filed Dec. 17, 2001.
Co-pending U.S. Appl. No. 60/341,932, filed Dec. 18, 2001.
Co-pending U.S. Appl. No. 60/577,833, filed Jun. 7, 2004.
Discover Desktop Conference with NetMeeting 2.0, by Mike Britton and Suzanne Van Cleve. 305pages, 1997.
Doi, S., et al, "Real-Time Remote File System for Multimedia Application," Jul. 30, 2000, IEEE, vol. 3, pp. 1727-1730.
Goldberg, et al., "The Ninja Jukebox," conference proceedings from the 2nd USENIX Symposium on Internet Technologies and Systems, Oct. 11-14, 1999, pp. 37-46, Boulder, Colorado.
International Search Report and Written Opinion of the International Searching Authority for PCT/US05/24324 mailed Jul. 20, 2007.
Liechti et al, "iRemote: a Platform for Controlling Public Displays with Mobile Phones", ATR Media Integration and Communication Research Lab, http://www.interaction-ipsj.org/archives/paper2001/pdf2001/olivier.pdf, Dec. 2000, all pages.
Lim, Swee Boon & Condry, Michael, "A Remote File System for Heterogenous Network Topologies," Nov. 15, 1993, IEEE, pp. 103-108.
Network, The Authoratative Dictionary of IEEE Standards Terms, 7th Edition 2000.
Path Construction for Multimedia Applications, website material from: bnrg.cs.berkeley.edu/.about.zmao/cs294-1/multimediaReport.doc, circa Oct. 1999, 7 pages.
Supplementary Partial European Search Report—EP05771205—Search Authority—The Hague—Oct. 25, 2011.
TV Brick Home Server, web site as of Apr. 7, 2004, <http://www.tvbrick.com>, provided by <http://archive.org> 6 pages.

(56) References Cited

OTHER PUBLICATIONS

TV Brick Home Server, web site as of Dec. 2, 2003, <http://www.tvbrick.com>, provided by <http://archive.org> 6 pages.
TV Brick Home Server, web site as of Dec. 28, 2003, <http://www.tvbrick.com>, provided by <http://archive.org> 6 pages.
TV Brick Home Server, web site as of Feb. 10, 2004, <http://www.tvbrick.com>, provided by <http://archive.org> 6 pages.
TV Brick Home Server, web site as of Feb. 3, 2004, <http://www.tvbrick.com>, provided by <http://archive.org> 6 pages.
TV Brick Home Server, web site as of Jul. 1, 2004, <http://www.tvbrick.com>, provided by <http://archive.org> 5 pages.
TV Brick Home Server, web site as of Jul. 19, 2003, <http://www.tvbrick.com>, provided by <http://archive.org> 6 pages.
TV Brick Home Server, web site as of Jul. 4, 2003, <http://www.tvbrick.com>, provided by <http://archive.org> 6 pages.
TV Brick Home Server, web site as of Jun. 12, <http://www.tvbrick.com>, provided by <http://archive.org> 5 pages.
TV Brick Home Server, web site as of Jun. 29, 2003, <http://www.tvbrick.com>, provided by <http://archive.org> 6 pages.
TV Brick Home Server, web site as of Jun. 8, 2004, <http://www.tvbrick.com>, provided by <http://archive.org> 5 pages.
TV Brick Home Server, web site as of Jun. 9, 2004, <http://www.tvbrick.com>, provided by <http://archive.org> 5 pages.
TV Brick Home Server, web site as of Mar. 22, 2004, <http://www.tvbrick.com>, provided by <http://archive.org> 6 pages.
TV Brick Home Server, web site as of May 8, 2004, <http://www.tvbrick.com>, provided by <http://archive.org> 6 pages.
TV Brick Home Server, web site as of May 20, 2004, <http://www.tvbrick.com>, provided by <http://archive.org> 5 pages.
TV Brick Home Server, web site as of May 25, 2004, <http://www.tvbrick.com>, provided by <http://archive.org> 5 pages.
TV Brick Home Server, web site as of Oct. 9, 2003, <http://www.tvbrick.com>, provided by <http://archive.org> 6 pages.
TV 'brick' opens up copyright can of worms, by Benoit Faucon, The Wall Street Journal (from Australian Financial Review) Jul. 1, 2003, published online Oct. 20, 2003 on http://mex-at-the-blogspot.com/search?q=brick, 1 page.

* cited by examiner

| SAT NAME | CAPABILITY | LOCATION |
|---|---|---|
| ID | <DISPLAY> | $LOC_3$ |
| . | | . |
| . | | . |
| . | | . |
| $ID_N$ | | $IP_3$ |
| $PN_2$ | | $IP_N$ |
| 412 | 414 | 416 |

410

420 → | SAT NAME | CAPAB | LOCAT |

430 → | SAT NAME | CAPAB | LOCAT |

440 → | SAT NAME | CAPAB | LOCAT |

SYSTEM AND METHOD FOR COMBINING MEMORY RESOURCES FOR USE ON A PERSONAL NETWORK

RELATED APPLICATIONS

This application is a Continuation of U.S. patent application Ser. No. 10/888,633, filed Jul. 9, 2004, entitled "SYSTEM AND METHOD FOR COMBINING MEMORY RESOURCES FOR USE ON A PERSONAL NETWORK", which application is hereby incorporated by reference in its entirety for all purposes.

TECHNICAL FIELD

The disclosed embodiments relate generally to the field of networks. In particular, the disclosed embodiments relate to a system and method for remotely controlling network resources.

BACKGROUND

There are an increasingly large number of devices that have network connectivity. Over the years, network connectivity has been extended to appliances such as refrigerators, home entertainment centers, and interactive box sets for use with television sets, digital cameras, and cell phones. With the evolution of these devices, there have been developments in home networks. For example, WIFI technology enables users to interconnect various network enabled devices wirelessly to form their own local area network. Various services and applications currently exist with the goal of establishing data connectivity between different network locations. The growth of the Internet and other types of networks has contributed to the numerous networking applications that currently exist.

There is also an interest in extending network connectivity to devices that can roam. These devices include cell phones, personal digital assistants (PDAs), and stations that can be assembled on vehicles or airplanes. While wireless networks for such roaming devices exist, these networks tend to have limited bandwidth, and can be expensive. In addition, it is difficult for operators of such devices to interact with networks, given that these devices often have poor user-interface features, and limited processing/memory resources for tasks that are often desired from them.

Currently, there are various interoperability issues when different types of network enabled devices are coupled. Often, the different devices operate on incompatible platforms or operating systems. This can cause problems in how these devices share data with one another. Furthermore, connected devices may use different data types (.WAV versus MPEG) and/or data formats that hinder the user's ability to share data amongst devices. As an example, the size of the screen display on a cell phone is typically too small to render images from a digital camera, even if the cell phone is camera-enabled. Often, the result is that when users want to share data amongst connected devices, that user must perform numerous manual steps, such as manually converting data formats.

There are various network applications that have pertinence to this application. One common network application is Instant Messaging (IM)—the service that establishes connectivity amongst users in different locations for purpose of enabling those users to send instant messages to each other. IM allows users to maintain a community list (e.g. "buddy list"), and the list can be configured to inform the user of the status of members in the community. The status information may correspond to the status of a particular member's terminal (if that member's computer is off, the status of that member on the community list may be "signed off"). The status information may also correspond to the status of the IM service or application as it is operated on a particular member's terminal. For example, a user may choose to close an IM application, in which case other members may be notified that the particular member is not available for messaging. The status information may also be provided manually by the user. For example, some IM applications allow the user to select a status ("stepped away"). In each case, the status information provides a mechanism by which a user can inform other select other users of a community of his or her status.

PC ANYWHERE is a troubleshooting application that allows an expert technician to remotely view a terminal for purpose of troubleshooting and software configuration. A user of a recipient terminal may request assistance from an expert. The user may need to be present in order to provide the expert permission to access his or her computer. When the expert logs on to a recipient terminal, the expert can use the PC ANYWHERE application to view the screen of the recipient terminal. The expert can also manipulate the recipient terminal, such as open files and operate applications. In turn, the recipient terminal may perform a series of refresh operations in order to transmit visual data of the recipient terminal's screen to the technician.

DETAILED DESCRIPTION

Figure 1:
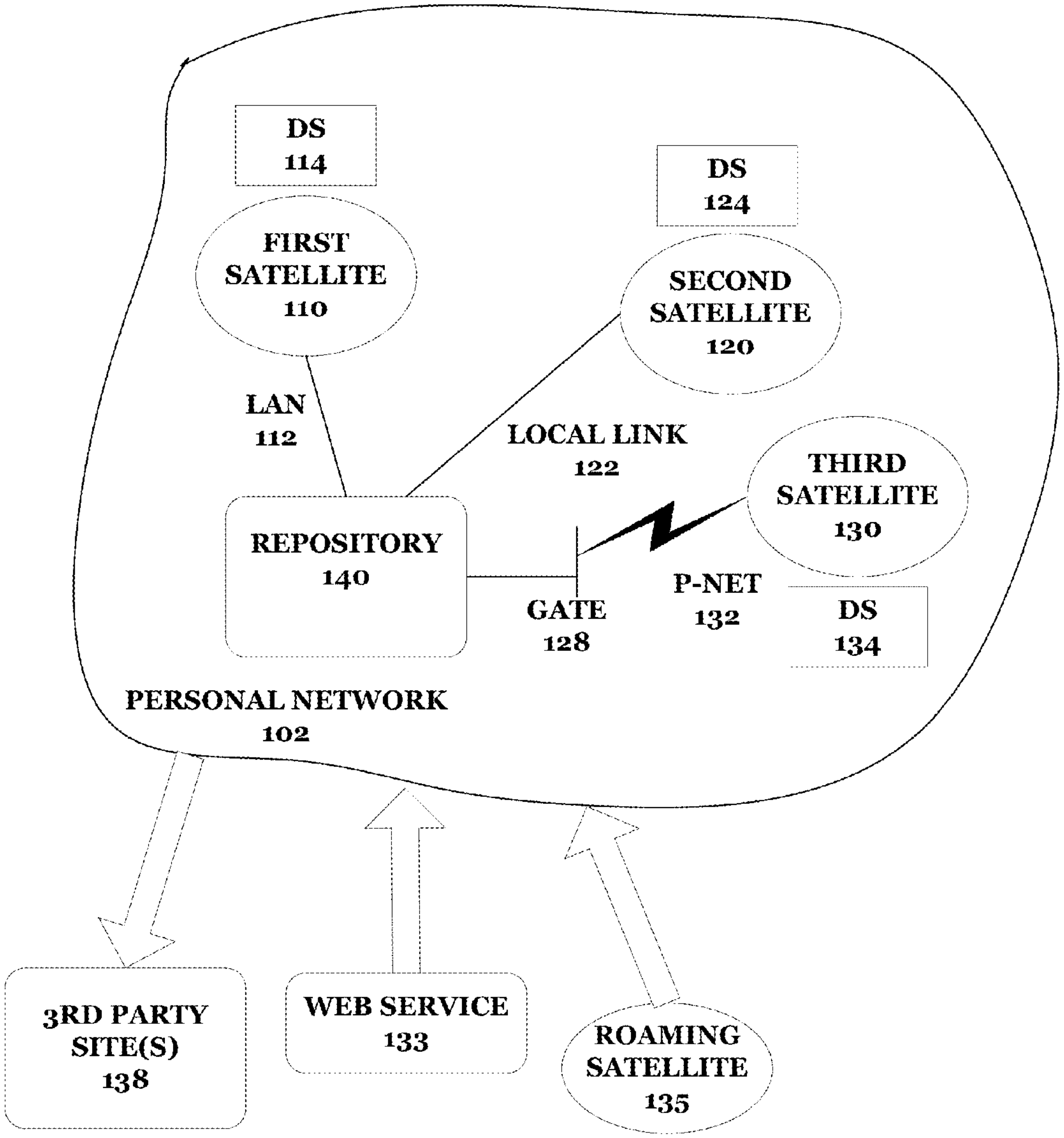
FIG. 1 illustrates a system on which a personal network can be implemented, according to an embodiment.

A system and method are described for enabling users to establish and define a network of devices and resources that are personal to the particular user or class of users. Such networks may be referred to as personal networks. Embodiments described herein enable such personal networks to be established using heterogeneous elements, such as, personal computers, software applications, Internet accounts, digital cameras, media stations, and network enabled appliances. The heterogeneous elements include hardware, software, data and other resources having different primary usages, operating systems, and/or platforms. In addition, the personal network may encompass elements that are interconnected over various types of data networks, including for example, the Internet, the public switched telephony network, or a cellular network. The connectivity established amongst the elements enables various seamless operations to be performed. Many functional aspects and benefits can be attained as a result of the connectivity established through the personal network.

Embodiments described herein provide that a personal network of heterogeneous elements may be presented and used as a single entity. The elements of the network may be referred to as satellites. In one embodiment, individual satellites in the personal network may communicate directly with some or all of the other satellites. A given satellite may receive data indicating a connectivity status for at least some of the other satellites. The given satellite may also receive information indicating a connectivity status for the one or more other satellites. In addition, the given satellite is configured to enable at least one other satellite in the personal network to be available for its use. This allows the given satellite to use the capability of another satellite.

The term "satellite" may include a designated element for a personal network that is capable of direct communications with one or more other elements of the network. Examples of satellites that can be used with embodiments described herein include a device, an application, a set of data, or a resource such as a third-party Internet account. In one embodiment, each satellite in a personal network corresponds to an element having an interface that enables that satellite to communicate directly with other satellites, particularly when the other satellites are provided the same or a compatible interface. The direct communications amongst satellites may correspond to peer-to-peer communications.

Embodiments described herein provide numerous advantages and benefits. Among the advantages, users can operate the various devices and applications that form their personal network through a single interface and from multiple devices or network locations. The functionality of the network devices can be made uniform and simple, so that the user does not have to learn and apply different operating procedures to accommodate different devices, operating systems, data types and/or applications. Data can also be treated more uniformly. For example, the user does not have to match specific media players for select data types.

Additionally, the resources of the personal network, including for example, the media library and media sources, can be made available to multiple heterogeneous devices, including devices that were not originally designed or suited for such functionality. For example, television transmissions can be redirected to various display-carrying elements of a user's personal network. But other than displays, it is possible that the elements do not necessarily have a primary or intended usage for displaying video and/or television signals. For example, in the case of a cell phone, the original manufacturing usage may be to enable users to view dialed and received phone numbers, emails and text content, and possibly low-resolution images. However, if such a device is configured as a network satellite or element, the device may be modified to receive media feeds.

Another embodiment described herein enable a user to control one or more other applications, either at the same time or in tandem. For example, a PDA can be provided a remote control application to control another device, or how data is handled by multiple devices in tandem. Various other benefits and advantages will be made more clear in this application.

According to an embodiment, the establishment of a personal network enables memory resources located at various locations and on multiple devices to be combined so as to have the appearance of a single entity. According to one embodiment, a combined memory may be defined by linking memory provided at different network locations of the personal network. The combined memory may traverse across multiple machines, operating systems, networks and network domains, and may even be distributed under the control of two or more entities. An association may be formed between a memory location in the combined memory and a known component or device that can communicate with the personal network. The component may correspond to a satellite or non-satellite. The association may be between an action or event performed or detected by the component and the memory location. Once the associated action or event is detected as occurring by the component, data related to that action or event may automatically be transmitted to and stored at the first memory location.

A known component or device may correspond to a component that has a known user (e.g. someone who has a password and login to the personal network, or a gateway on the personal network). The known component or device may also correspond to a device that has a history of use with the personal network, or can otherwise be verified as being trustworthy. In many cases described herein, a roaming device may be a known component, but not a satellite. Non-satellite devices may lack the interface, or otherwise be precluded (such as by firewall) from forming direct, bi-directional communications with other satellites. Non-satellite devices may still include some components that permit a limited access to the personal network, such as a browser to view web content, etc.

Other embodiments describe different uses and applications for a personal network. The plurality of satellites may be interconnected to form at least a part of a personal network. Each satellite may an interface (such as an application program interface) for communicating with one or more other satellites. On a roaming device, an embodiment provides that data is automatically received to indicate a connectivity status for one or more of the plurality of satellites.

In another embodiment, data structures may be associated with each of a plurality of satellites that form the personal network. Each data structure may carry data that indicates a connectivity status for at least some of the other satellites, and a capability of at least some of the other satellites. The data structure may be automatically updated on at least some of the satellites in the personal network when (i) an additional satellite is interconnected to be on the personal network, or (ii) another satellite is disconnected from the personal network. According to embodiments, the data structure may be in the form of a table, database, or relational data structure.

Data stored in the data structure of one satellite and corresponding to the capability of another satellite may provide information about the other satellite's characteristics. These characteristics may include, for example, a processor type or capability used by the other satellite, a memory size available to the other satellite, a display size, a display resolution, and a bandwidth of network connection for the other satellite.

A personal network may be used to share information about desired media and media programs. In an embodiment, a satellite of a personal network may be configured to receive data corresponding to select media programs. These media programs may be provided over channels of an external media programming source (such as cable or satellite television). The user may specify what programs are of interest to him through interaction with a satellite in the personal network. Through the interaction, a schedule may be made available for one or more of the satellites. The schedule may also be made available to registered components of the personal network, such as roaming, non-satellite devices. The schedule may list programs of interest for the user, based on the user's interest.

In an embodiment, the user may change his or her selection of media programs. This change may be detected by the user. The schedule may then be updated for use by one or more of the plurality of interconnected satellites According to another embodiment, a user may interconnect a plurality of satellites to form a personal network. A plurality of locations may be identified that form at least a part of the personal network. The satellites may be provided at the network locations. A plurality of items may be selected by the user and provided at each of the plurality of network locations. A plurality of items may be selected by the user and provided at each of the plurality of network locations. An aggregate presentation of the plurality of items may be formulated and provided.

Change to the items in the combined memory may in turn generate an automatic update or change in the aggregated presentation of the content. These changes may include the addition or deletion of a particular item.

Another embodiment enables applications for to use one satellite (including a device or application) to remotely control one or more other satellites. Additional embodiments enable one satellite to control multiple satellites in tandem.

According to one embodiment, a satellite interconnected to form part of the personal network is enabled to (i) access media resources on at least a second satellite in the plurality of satellites, (ii) initiate the second satellite to perform an operation for generating a media output from one or more of the media resources, (iii) direct the second satellite to stream data corresponding to the media output to the first satellite, and (iv) generate a remote media output from the streamed data.

Furthermore, one or more embodiments described herein may be implemented through the use of instructions that are executable by one or more processors. These instructions may be carried on a computer-readable medium. Machines shown in figures below provide examples of processing resources and computer-readable mediums on which instructions for implementing embodiments of the invention can be carried and/or executed. In particular, the numerous machines shown with embodiments of the invention include processor (s) and various forms of memory for holing data and instructions. Examples of computer-readable mediums include permanent memory storage devices, such as hard drives on personal computers or servers. Other examples of computer storage mediums include portable storage units, such as CD or DVD units, flash memory (such as carried on many cell phones and PDAs), and magnetic memory. A computer-readable medium as used herein may extend across multiple machines. For example, the medium may be distributed between client and server in order to perform a stated task or operation.

Architecture Overview

FIG. 1 illustrates a system on which a personal network can be implemented, according to an embodiment. As shown, a personal network 102 is formed in part by a first satellite 110, second satellite 120, and third satellite 130. In one embodiment, each satellite 110, 120, 130 is provided on a separate device (see e.g. FIG. 3). However, a satellite may also correspond to an application or data set residing on a particular device, so that the particular device can include multiple satellites. In one embodiment, a satellite corresponds to any application, sequence of instructions, or set of data which can be provided an interface (such as an application program interface or API) for other use by other applications. In particular, two or more heterogeneous applications may be enabled to communicate with one another through use of a similarly configured API for purpose of allowing at least one application to control or otherwise use another application. For example, a satellite may correspond to a commercially available media player application that has been recompiled to include a reconfigured API for use with other similarly configured (but perhaps heterogeneous) applications. As will be described, an embodiment provides that the API accommodates a heterogeneous network.

A repository 140 is coupled to communicate with each satellite 110, 120, 130. As will be described, the repository 140 maintains an identification of each satellite actively connected to the personal network 102, as well as a description of a capability of each such satellite. The repository 140 may correspond to a satellite that performs, as part of its operations, the task of maintaining a table or master list of such information about all other satellites in the personal network. Each satellite 110, 120, 130 may also communicate with one or more of the other satellites directly. In one embodiment, communications between the repository 140 and each of the satellites 110, 120, 130 is of a server-client relationship, while communications amongst satellites is of a peer-to-peer nature. In the context of embodiments described, one difference between client-server and peer-to-peer communications is that with client-server communications, communications between two satellites (that are not servers) requires communications with at least one intermediary-that being the server. First, one satellite would have to exchange communications with the server, then the server would forward that communication by exchanging communications with the other satellite. In many situations, this can be disadvantageous, because the server can create a bottle-neck. In peer-to-peer communications, the intermediary server can be avoided, as communications between two satellites is direct.

The personal network 102 may be formed by interconnecting satellites across multiple types of communication mediums. In an example provided by FIG. 1, a local area network (LAN) 112 is used to couple (indirectly or directly) the first satellite 110 to the repository 140. A local communication link 122 is used to couple the second satellite 120 to the repository 140. A public network 132, such as the Internet, is used to couple the third satellite 130 to the repository 140. Once the personal network 102 is established, access to satellites and/or the resources of the personal network may be made through use of public networks such as the Internet. In one embodiment, resources available on the personal network are presented, made viewable or otherwise accessible to the user (or to those with permission to access the network) as a single entity. For example, files, content, programs and other resources may be presented in an aggregated fashion, under a single user-interface, so that the user is unaware where the different resources originated from. Thus, for example, a user may define the satellites of the personal network 102, then subsequently access the personal network 102 from any remote location to view resources on the personal network as if the personal network was one computer or network element.

In an embodiment, satellites 110, 120, 130 may communicate with repository 140 and with each other. While satellites 110, 120, 130 are connected and disconnected, the repository 140 may always be active on the personal network. Accordingly, the repository 140 may be made redundant, and running on different locations. In addition, the contents of the repository 140 may be archived. The communication amongst satellites or between a particular satellite and the repository may be direct or indirect. For example, while FIG. 1 illustrates the local communication link 122 extending between the second satellite 120 and the repository 140, the local communication link 122 may actually extend between the second satellite 120 and another satellite. Thus, for example, the first satellite 110 and the second satellite 120 may be connected using the local communication link 122, so that the second satellite 120 may be interconnected to one or both of the other satellites 110, 130 and the repository 140 using both the local communication link and the LAN 112.

In FIG. 1, the third satellite 130 is illustrated as a non-mobile or non-roaming device that connects to form part of the personal network 102 over the Internet. In an embodiment, the third satellite 130 communicates with one or more other satellites 110, 120 and the repository 140 using a gateway or proxy 128. For example, the gateway 128 may provide access to a home network, on which the repository 140 and one or more of the other satellites resides. The third satellite 130 may use the gateway 128 to establish communications with the other satellites and the repository 140. Resources of the personal network may be made available to other types of remote network sites. Furthermore, other remote sites may be made part of the personal network, or otherwise used to contribute to the personal network. In one embodiment, a roaming device 135 may access the personal network 102. The roaming device 135 may be a satellite, in that it includes an API that can communicate with or receive communications from other satellites. Alternatively, the roaming device 135 may be a non-satellite, in that it includes no API, but has other applications with limited ability to use or work with certain resources on the personal network. For example, the roaming device 135 may include a browser to enable it to view content from the personal network, and perhaps perform certain actions (such as send files that are handled by the personal network). Still further, the roaming device 135 may correspond to a quasi-satellite, in that it may have limited permissions or usability on the personal network as compared to other satellites, but otherwise includes an API is used to communicate with or receive communications from other satellites. The roaming device 135 may also use the Internet, or a wireless network (such as a cellular network) to establish the connection. While third satellite 130 may have a designated location of known IP address, roaming devices may connect to the personal network 102 from any location.

In addition to roaming device 135, access to the personal network 102 may be made through a web-service 133. In an embodiment, an Internet site may be provided as a service to enable or assist subscribers/users to establish personal networks. The users may provide content, resources, configuration instructions, and/or other information to establish, configure, and/or provide resources or content on their own respective personal network. In an embodiment, the user may also have limited use (such as to view or otherwise consume content) of the personal network, similar to that of a non-satellite roaming device, described above. In another embodiment, the web service 133 can be used to make any Internet terminal a point form which a user can provide such information for his or her personal network. It is possible for the web service 133 to act as an interface to provide satellite or quasi-satellite functionality to any Internet terminal.

In an embodiment, personal network 102 may comprise resources, and in particular, user-designated resources, which are made available over public networks, such as the Internet. For example, a designated, third-party Internet site 138 on which a user's data or application is maintained may be made an element of the personal network 102. An example of the designated network location 138 may be a personal account for maintaining files (such as pictures or media) on a storage medium provided by a third party Internet site (e.g. YAHOO! BRIEFCASE). These locations may be linked with the satellites 110, 120, 130 to form the personal network 102. Once linked, content may be selected or otherwise provided from the designated network location 138 to other satellites on the personal network 102. Alternatively, resources such as memory may be made available to other satellites in the personal network 102.

As described by embodiments, personal network 102 combines the interoperability and availability of heterogeneous elements. In operation, elements of the personal network 102 may aggregate content, data, applications, and resources to maintain an appearance a single entity. Furthermore, as will be described in greater detail, satellites in the personal network 102 may cooperate with and use each other's capabilities even though the satellites are heterogeneous elements. Thus, the satellites cooperate with one another in a manner that is seamless and platform independent.

According to an embodiment, at least some of the capabilities for each satellite are known and accounted for in the personal network 102. The repository 140 maintains a record of each satellite's known capabilities, including the operations it can perform, and the limitations or requirements that must be accounted for in using that satellite. This includes specific functionality provided by each satellite, interoperability requirements of each satellite, any hardware limitations presented by a satellite or a device on which the satellite is provided, and bandwidth limitations of the particular satellite. Information about each satellite's capabilities may be provided in the form of code. In one embodiment, a natural language code is used to record information about each device's capabilities. In addition to satellite identification and capability information, the repository 140 may maintain status information and location information for each satellite. The status information may indicate whether a satellite is connected or not connected to the personal network. Alternatively, the status information may be maintained by only recording the presence of active satellites on the personal network 102. The location information may correspond to the local IP address of a device on which the satellite resides. In the case of satellite 120, which is connected to the personal network 102 via local link 122, the location information may correspond to an identifier of that satellite and an IP address of the device or network location to which that satellite is connected.

While some capabilities are known, an embodiment provides that other capabilities of individual satellites are determined on-the-fly. This is particular the case with capabilities that are prone to fluctuate, such as bandwidth. For example, the bandwidth of a wireless device may vary, depending on the time of day or location of the wireless device. One embodiment provides that another satellite queries or tests a satellite of interest for a particular set of capabilities. For example, the testing satellite may attempt to send the satellite of interest a file, and measure the time or amount of bandwidth that was available for that operation. Once the determination is made, the testing satellite can pass the information to a satellite that actually wants to use the satellite of interest. In one embodiment, the testing satellite has a dedicated function or role, although other embodiments provide that the testing satellite and the satellite that wants to use the satellite of interest are the same. The testing satellite may correspond to the repository 140, or to a dedicated satellite.

While satellites in the personal network 102 may communicate with one another and use each other's capabilities, it may be assumed that each satellite does not need to communicate or use every other satellite. Rather, each satellite may have a set of pertinent satellites on the personal network 102 that it may communicate with and use. For example, a digital camera application may require use of satellites that include photo imaging application and photograph printer driver, but the camera application will have no need of an audio playback component. Thus, the set of pertinent satellites for the digital camera do not include the audio playback component.

In an embodiment, each satellite 110, 120, 130 includes an associated data structure that maintains information about the pertinent set of satellites for that satellite. The first satellite 110 includes a first local data structure 114, second satellite 120 includes a second local data structure 124, and third satellite 130 includes a third local data structure 134. It is also possible for two satellites to share a local data structure, such as in the case where two satellites reside on a common machine or are interconnected by local connections. Each of the satellites 110, 120, 130 may use their respective local data structures 114, 124, 134 in order to access, locate and use other satellites in the personal network. The local data structures 114, 124, 134 may each receive their information from the repository 140. Thus, the information maintained in the local data structures 114, 124, 134 may be in the same form as the information maintained in the repository 140. In either case, the local data structure may serve as a means to reduce the amount of information that needs to be maintained for a particular satellite. Once information is transferred from the repository 140 to the local data structures 114, 124, 134, the respective satellites 110, 120, 130 may avoid having to make requests for such information from the repository. While it is possible to provide information to the satellites exclusively from the repository 140 without implementing local data structures 114, 124, 134, the use of the local data structures provides a more efficient and secure means for making necessary information available to the respective satellites 110, 120, 130. This is particularly true in the case where satellites are interconnected through large or public networks.

It should be noted that while a home network is one context for the personal network 102, implementations may be used in which the personal network exists separate from the home network. For example, a user's personal network and home network may share some satellites, but some devices or applications of the home network may not be shared with the personal network, and vice-versa.

Establishing the Personal Network

Figure 2A:
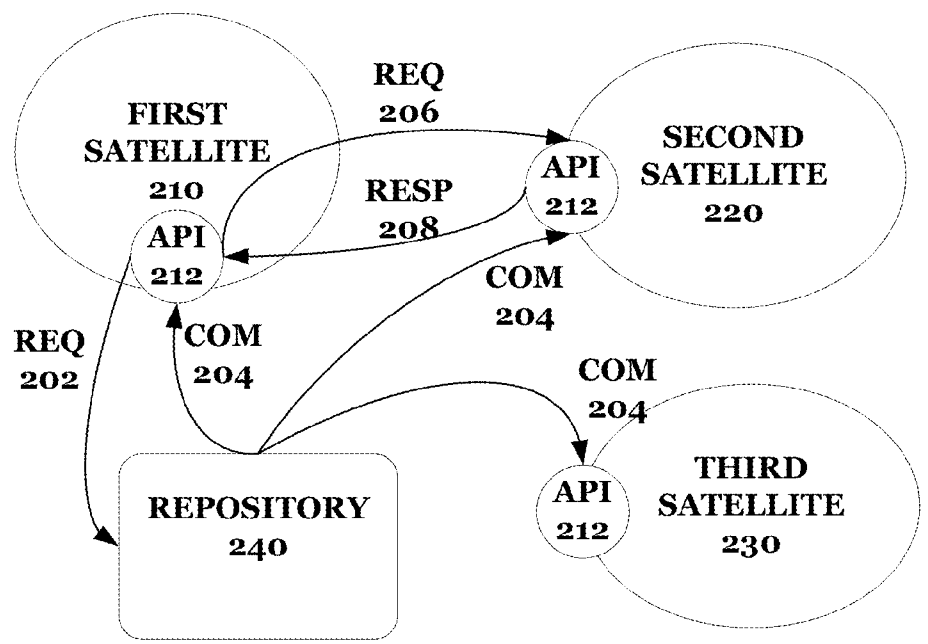
FIG. 2A describes a methodology that illustrates how a personal network can be established, according to an embodiment.

FIG. 2A describes a methodology that illustrates how a personal network, such as described in FIG. 1, may be established. The satellites and components described with FIG. 2A may or may not coincide with elements of FIG. 1. For brevity, the connectivity medium of the satellites described in FIG. 2A, or specifics as to how the satellites operate with other satellites, will not be detailed again.

FIG. 2A illustrates a first satellite 210, second satellite 220, and third satellite 230, each of which is interconnected to a repository 240. Each satellite 210, 220, 230 corresponds to one of a data set, application or device. Furthermore, each satellite 210, 220, 230 includes a corresponding application program interface (API) 212 to enable one satellite to communicate with another satellite, or to provide access to the other satellite. The API 212 enables connectivity amongst satellites 210, 220, 230 in order to enable the satellites to share and/or receive capabilities, content and other resources. The API 212 also enables the satellites 210, 220, 230 to communicate with the repository 240 in order to receive connectivity information and other information about the other satellites. Each satellite 210, 220, 230 is one of a data set, application or device that either includes the API 212 as an integrated component, or is capable of being used when the API 212 is provided to it. In the latter case, the satellite may correspond to a commercially available application (perhaps provided by a third party) that can be recompiled or reconfigured to include API 212.

In an embodiment, a personal network may be established by individual satellites joining the personal network. Initially, the repository 240 may be established, and additional satellites are added to form the personal network on which the second satellite 220 and third satellite 230 are already members. FIG. 2A illustrates a case where first satellite 210 is added to the personal network. A request 202 is made by the first satellite 210 to the repository 240 to join. The request 202 is a client-server type communication. Included in the request are instructions containing information about the capabilities of the first satellite 210. Additional information describing the first satellite 210 to the repository 240 may also be included. The additional information may include data identifying a location of the first satellite (e.g. IP address).

The repository 240 receives request 202, and records the information, including the instructions and the location of the first satellite 210. In response to receiving the request 202, the repository 240 sends out a communication 204. According to one embodiment, the communication 204 is sent out to all of the satellites that are actively connected to be in the personal network. The communication 204 includes information about all of the active satellites in the personal network. As such, the communication 204 provides information to each satellite about what satellites are part of the personal network at a given moment when the first satellite 210 joins. The information in the communication 204 may also include the capabilities and location of each device actively connected to be part of the personal network.

According to another embodiment, the repository 240 includes intelligence to be able to determine what satellites are pertinent to the newly joined first satellite 210. The communication 204 may only be sent out to the pertinent satellites, rather than broadcast to all satellites. This provides one mechanism by which the satellites can maintain local data structures (e.g. 114, 124, 134) that omit information about non-pertinent satellites. In one embodiment, repository 240 may acquire the intelligence for determining what satellites are pertinent to the first satellite from the first satellite itself, and specifically from the request 202 or other notification from the first satellite. Alternatively, the repository 240 may maintain or have access to a master library that includes lists of pertinent satellites for any given satellite. Still further, as another alternative, each satellite may include its own intelligence to determine what information contained in communication 204 is about non-pertinent satellites and can be omitted.

Once communication 204 is completed, the first satellite 210 can be assumed to be part of the personal network. It is then possible then for communications to be made to the first satellite 210 from other satellites. In the personal network, one satellite may use a service provided by another satellite. A service is part of the capabilities described for a particular satellite. Thus, the capabilities of each satellite may include the service provided by that satellite, as well as limitations or features of the particular satellite. In, for example, a case where first satellite 210 needs a service from second satellite 220, the first satellite makes a request 206 directly to the second satellite. The request 206 may be a peer-to-peer communication, as opposed to a client-server communication. The second satellite 220 may then generate a response 208, which establishes that the second satellite 220 will provide the requested service to the first satellite 210.

As an alternative, request 206 may not be specific to second satellite 220, but rather a broadcast or announcement sent on the personal network. This may occur in an embodiment where the first satellite 210 does not know the capabilities of other satellites, or when more than one satellite can provide the requested service. An available satellite that is capable of providing the requested service may then generate the response 208.

Figure 2B:
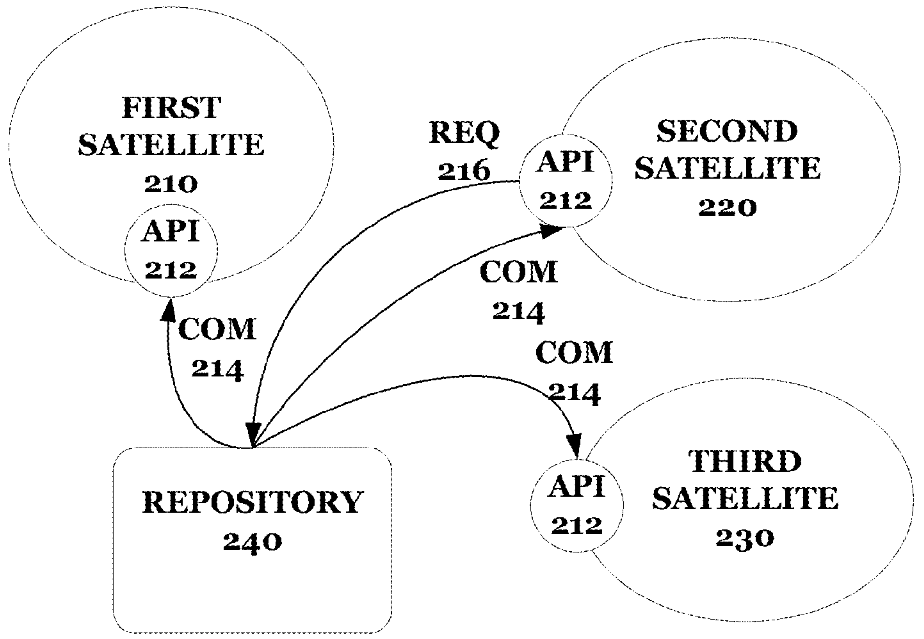
FIG. 2B illustrates how the personal network can be maintained by tracking when satellites disconnect or otherwise become unavailable on the personal network, under an embodiment.

According to an embodiment illustrated by FIG. 2B, the personal network may be maintained by tracking when satellites disconnect or otherwise become unavailable on the personal network. For example, second satellite 220 may be disconnected. In an embodiment, second satellite 220 may be disconnected from the personal network in a manner similar to the first satellite 210 joining the personal network. That is, second satellite 220 sends a notification 216 to be disconnected. Since the request is to be discontinued, the notification 216 may not include information, such as a description of the capabilities or location of the second satellite. Upon receiving the notification 216, the repository 240 may provide a communication 214. The communication 214 may be broadcast to all of the satellites (excluding first satellite 210). The communication 214 may contain information about the satellites that are actively connected to the personal network. In one embodiment, communication 204 and 214 are substantially similar, except they include information from the repository 240 at different times. As with communication 204, an embodiment may provide that the communication 214 is sent to the satellites that are pertinent to second satellite 220.

Figure 3:
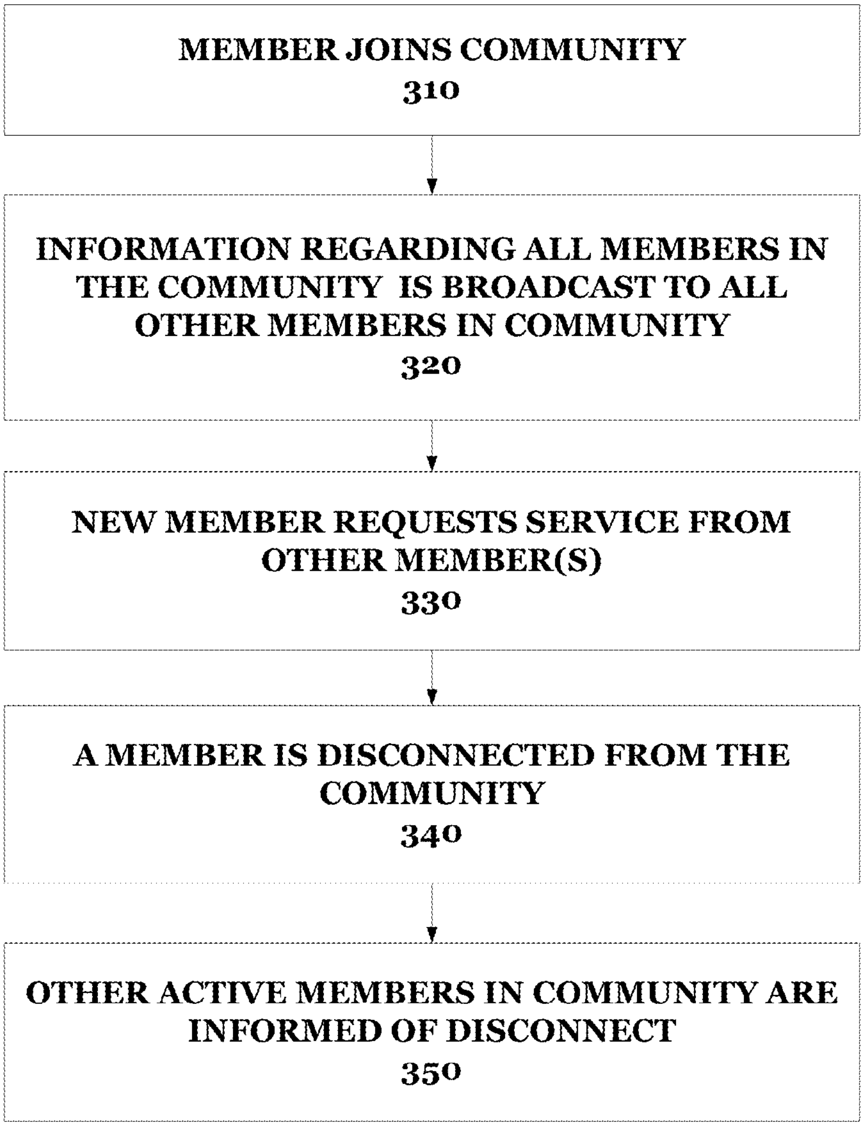
FIG. 3 illustrates a method that illustrates how members of a community network can join and receive real-time information regarding a presence of other members in the community

FIG. 3 is a method that illustrates how members of a community network can join and receive real-time information regarding a presence of other members in the community. An example of the community referenced herein includes a personal network. An example of an application of such a method is the participation of any satellites 210, 220, 230 in the personal network described with FIGS. 2A and 2B.

In step 310, a member joins the community. In joining the network, a central location (such as repository 240 in FIGS. 2A and 2B) is provided information about the new member. This information may be provided by the new joining member. The information may include instructions that other members in the community can use to communicate with the new joining member. The event of the member joining the community may occur automatically when the member is activated. For example, each of the satellites 210, 220, 230 (see FIGS. 2A and 2B) may include instructions that cause that satellite to automatically seek out and join a designated community or personal network whenever a device of that satellite is turned on. Alternatively, the member may be directed to the personal network manually, or on the occurrence of some event such as a schedule or alarm. Depending on the capabilities of the member, the member may seek out the personal network over the Internet, a LAN, home network, cellular network or other data-carrying network.

Once the member joins the community, step 320 provides that information regarding all members in the community at that particular instance is broadcast to all other members in the community. In an embodiment, the information may be determined from a structure such as repository 240. Since the community may extend across numerous types of networks (e.g. LAN and Internet), the broadcast may be made so that it can be transmitted across various types of networks. In one implementation, a hypertext transfer protocol (HTTP) message is transmitted, with the root path of the message specifying the network (Internet, LAN etc.) on which the recipient is connected. The newly joined member also receives the broadcast. In an embodiment, each member retains information from the broadcast about other members in the community that are pertinent to that member.

After joining the community, step 330 provides that the new member may request a service from the other members. The new member may maintain a list of other members in the community that are pertinent to it. The list may include specific capabilities or services offered by other members, and instructions for communicating with each pertinent member. The list may also provide a location of each pertinent member. The service that is requested may be in response to an action that is to be performed or has been performed by the new member. For example, a user may request an action to be performed that requires the cooperation of another member. In one application, a user may request to view a set of digital pictures using a photo-editor service. While using the photo-editor service, the user may request another service to print select pictures at a remote site. As an alternative, the new member may provide access to another service provided by another member at a different location. For example, the user may request a digital video recorder to record a television program from the user's office.

After use, step 340 provides that the member may also be disconnected from the community. For example, the member may correspond to a particular service that runs on a user's work station. When the user leaves work and logs-off, the particular member may disconnect from the remainder of the personal network, which may include elements from the user's home network. According to an embodiment, a member disconnects by first sending a request to a central location (such as the repository 240 in FIGS. 2A and 2B). The request is processed from the central location.

In response to processing the request, step 350 provides that the other active members in the community are informed of the member that disconnected. In one embodiment, a broadcast is sent to the active members. The broadcast simply includes a list of the active members (as well as their capabilities, location and other information). The other members receive the broadcast and reset their understanding of the other members in the community.

Figure 4:
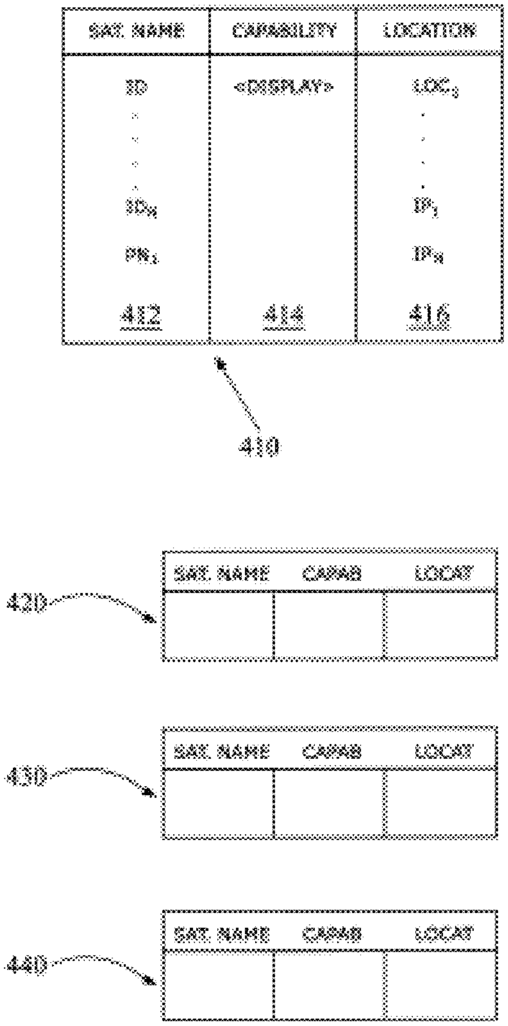
FIG. 4 illustrates data structures that can be used to inform individual satellites of a personal network information about other members in the personal network, according to an embodiment of the invention.

FIG. 4 illustrates data structures that can be used to provide information to satellites about other members in the personal network, according to an embodiment of the invention. In FIG. 4, a repository 410 (may correspond to repository 140 in FIG. 1) shares data with data structures 420, 430 and 440 (which may correspond to the data structures 114, 124, 134 of respective satellites). As mentioned, the repository 410 maintains a master list of the satellites and other elements of the personal network, while the respective data structures maintain subsets of the master list. In an embodiment, the data structures 420, 430, 440 are each maintained in association with one or more corresponding satellites. While FIG. 4 illustrates use of separate data structures for individual satellites, it is possible for satellites that reside at a common location, or on a common device to share a common data structure. It is also possible for satellites that are closely integrated (such as executable on a shared platform) but on different platforms to share a common data structure.

In an example provided by FIG. 4, each of the repository 410 and the data structures 420, 430 and 440 are structured as tables. With respect to repository 410, there is a first column 412 containing identifiers to individual satellites and other members of the personal network. While satellites 412 may correspond to services that run on a user of the personal network's device or resource, elements identified in the first column 412 may also include third-party services offered over public networks. Examples of such networks include POP Internet email accounts, YAHOO! PHOTOS and BRIEFCASE, online music services (APPLE iTUNES) and public file sharing networks. At least with respect to satellites, a second column 414 may be provided in which a capability of the satellite is provided. While the contents of second column 414 (or other columns) may be in code, the code may also be descriptive to an administrator. One type of capability listed in the column 414 may be a service that can be performed by the satellite. The service may be described as a list of functions or operations. Another type of capability listed in the column 414 may provide considerations or aspects on the satellite and/or the device on which the satellite resides on. This information may be listed explicitly or implicitly via reference to a library. In addition to the capabilities, other information such as the location of the satellite may be provided in a third column 416. Other columns may be added as needed.

The capabilities listed in second column 414 may be processed by other satellites who wish to use the particular satellite being described. In one embodiment, the information provided in the repository 410, and with the second column 414 in particular, are provided as a natural language code. The natural language code presents code with syntax and semantics that correlate to a natural language, such as English. For example, a natural English code facilitates users to view and edit the repository 410. The natural language code may be created so as to not discriminate between devices, platforms, and/or operating systems.

In FIG. 4, three examples of satellites are described in repository 410. A first satellite in the repository 410 is for a printer driver. The printer driver may be for an associated printer that is connected on the personal network. The service described in second column 414 for the printer driver is "display". The location of the printer driver in the third column 416 may be provided in the form of a LAN address. A second satellite in the repository 410 is for a photo server. The service described for the photo server is to retrieve (locate and copy) photo files. The location of the photo server may correspond to the same LAN address as the printer server, as both satellites may be located on a common computer in the personal network. In an example provided, a third satellite in the repository 410 may be for a media player. The service described is to playback media. The location of the third satellite may coincide with the location of the other satellites.

In an embodiment, the data structures 420, 430, 440 list rows from the repository 410 that are pertinent to the particular satellite associated with the respective data structure. Non-pertinent satellites (those providing services that will never be used by a given satellite) may be omitted from the data structure of the given satellite. With respect to the first data structure 420 for the first satellite, the rows listed may include the photo server, as the printer driver may need the photo server to locate a particular file (see an example provided with FIG. 6). With respect to the second data structure 430 for the second satellite, the printer driver and the media player may both be pertinent satellites, as the media player may be used to display images, provided by the photo server. The third data structure 440 may list the photo server as a relevant service.

Heterogeneous Aspect

Figure 5:
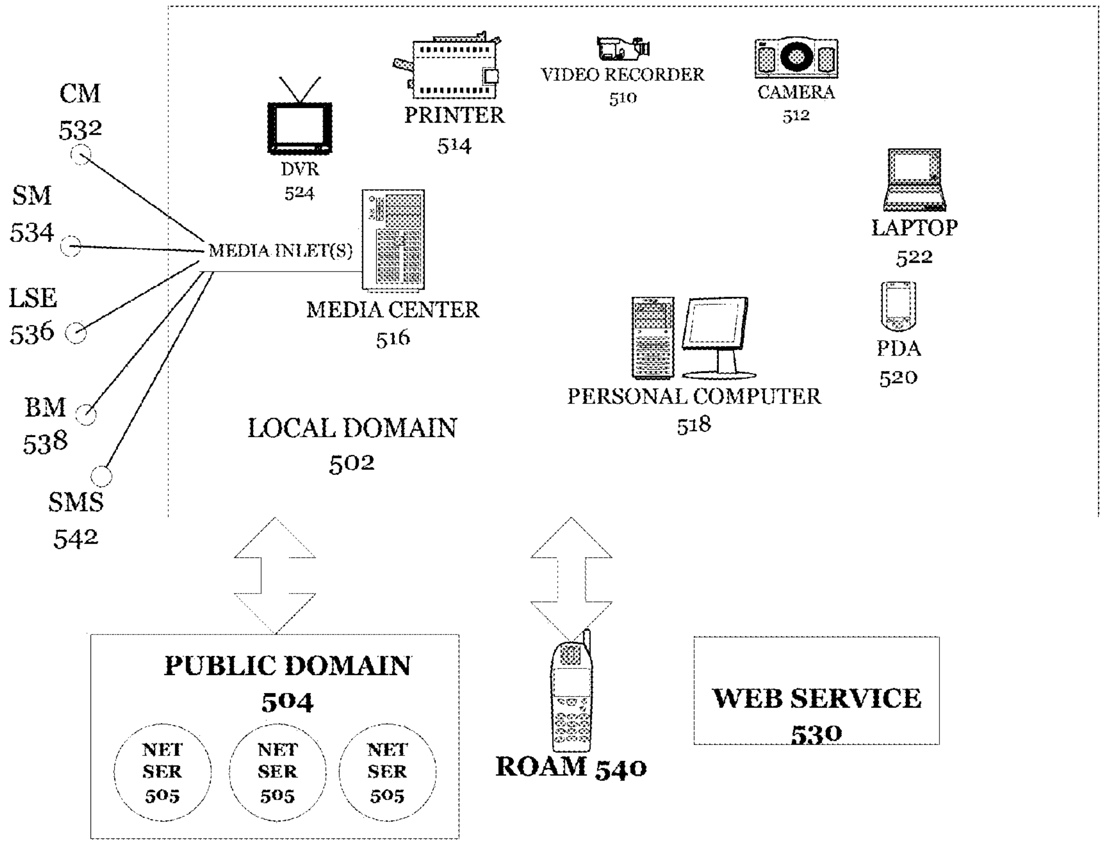
FIG. 5 illustrates a personal network formed from a plurality of heterogeneous members interconnected across numerous data transfer mediums.

FIG. 5 illustrates a personal network formed from a plurality of heterogeneous members interconnected across numerous data transfer mediums. The heterogeneous members (or satellites) may be provided on and/or correspond to devices that operate on different platforms (e.g. wireless) or use different operating systems. The heterogeneous members may also correspond to applications or data that are configured for such different platforms or operating systems, as well as applications that are otherwise not capable of being interfaced with one another, without external intervention. A personal network may be established by a user, or a community of users, based on devices, applications, and data of that user or community.

In an example such as shown in FIG. 5, the personal network includes a local network domain 502 and a public network domain 504. Additional or fewer domains may be used, depending on the needs of the user or the community. Satellites in the personal network, either individually or in combination with other satellites, may provide one or more service. FIG. 5 illustrates examples of devices that may be interconnected by the personal network, either as satellites or through the user of satellites. In the example provided, the devices include a video recorder 510, a digital camera 512, a printer 514, a media center 516, a personal computer 518, a personal digital assistant (PDA) 520, a portable computer (e.g. laptop) 522, a digital video recorder 524 (such as provided by TiVo). In the example provided, the devices are interconnected on the local network domain 502. Other network domains may be added to the personal network, using networks such as the Internet, or the public switched telephony network (PSTN). In addition, the resources available on the public network domain 504 (such as the Internet) may be provided for use in the personal network. These resources include, for example, network locations 505 on which files are stored (e.g. YAHOO! BRIEFCASE), Internet email accounts, and Internet media services (APPLE iTUNES).

Satellites may be used to enable the devices to interface and cooperate with one another in an active and responsive manner. To this end, individual satellites may reside on one or more devices to interface with a corresponding device, including to retrieve or accept data from the corresponding device, to provide data to the corresponding device, and/or to control the corresponding device. A satellite may either be configured to interface with the corresponding device, or the corresponding device may be provided an interface for accepting communications with the corresponding satellite. The location of the satellites may be distributed and/or centralized. In one embodiment, the locations of the satellites are focused in a location selected by the user. A primary location of the satellites may correspond to the most powerful and connected computer machine on the personal network. In the example provided by FIG. 5, this location may correspond to the user's personal computer, laptop or media center. However, specialized satellites may be configured especially for smaller devices. For example, a remote control application with a remote control interface may be provided for the PDA 520. The PDA 520 may use a network connection to control applications, or other devices on the network.

In an embodiment, the personal network, its resources, and/or its elements may be accessible from external sites via the Internet or any other data network. Additionally, another web service 530 may be provided to enable a user to configure the personal network based on the user's desired capabilities, services, and devices. The web service 530 may receive user-information on (i) what devices, applications, and data sets the user wishes to make available on the personal network, (ii) information about the specific models the user has, including the capabilities of such devices, (iii) account information for the accounts on the public network domain 504. The user-information may provide additional configurations as well. These may include selections of media files or media sources, what may be viewed as channels, and what devices may perform functions or use particular services. In one embodiment, any user-input for specifying, configuring or otherwise enabling an aspect or service of the personal network may be made through the web service 530.

In an embodiment, access to elements of the personal network may be provided to a roaming device 540. Roaming devices may include, for example, smart phones (such as web-enabled cellular phones), or WIFI enabled devices that locate and communicate with the personal network from a WIFI station. Services may be provided to extend functionality of the roaming device 540 with respect to the personal network. For example, the services may enable the roaming device 540 to deliver files to the personal network for storage and/or consumption by other devices, to view files and content stored on the personal network, to playback or reproduce media from media files stored on the personal network, and to playback media from the various media sources. Embodiments described herein provide that a roaming device has access to a personal network either as a satellite, or as a non-satellite. As a satellite, the roaming device is equipped with an API to handle communications with other satellite. But since the roaming device connection is temporary, network security preferences may designate the roaming device to have certain limited functions as a non-satellite. These functions include browser capabilities to view data on the personal network. To accommodate this, a web-service or other satellite may format data to accommodate browsers. In addition, certain actions that are native to applications on the roaming device may be configured into and accommodated by the personal network. For example, as described in later embodiments, the roaming device may include a program to cause it to automatically send a captured image or recorded media to the personal network. A satellite on the personal network may also be configured to handle and store the captured image or media at an appropriate place.

In addition to interfacing with one or more local network domains 502 and public network domains 504, the personal network may be configured to handle media, including to accept media from different sources, to store and distribute media, and to make media available to the different devices. To this end, the media sources may include one or more of the following: cable media feed 532 (e.g., television and radio channels), satellite media feed 534 (e.g., television and radio channels, XM radio), live streaming events 536 delivered from the World Wide Web (e.g., Internet television), broadcast media 538 (e.g., FM radio, AM radio, regular television), and streaming media sources 542 on the Internet (e.g., NAPSTER, APPLE iTUNES). In an embodiment, the different media sources are fed to the media center 516, which then processes the various forms of data. Services provided on or made available to the media center 516 may be used to then make various media from the different sources available to the personal network.

Creating a Personal Network

An embodiment provides that a user (or a community of users) may establish a personal network by installing an open repository proprietary ("ORB") application on one or more devices that are to be part of the user's personal network. One installation results in the formation of the repository (see element 240 FIGS. 2A and 2B). An embodiment provides that on each device, the installation connects to one or more satellites that provide corresponding services. In one scenario, the installation may provide a newly installed application on a device, while in another scenario, the installation causes the recompilation of one or more existing applications. The recompilation provides an interface to enable the existing application to communicate with the repository. Such an application is sometimes referred to as being "ORB-enabled". In either case, the interface provides the mechanism by which individual satellites (whether newly installed or recompiled existing application) communicate with one another.

Each ORB application or interface may include a set of instructions that are redundant in objective, but written for a particular operating system, programming language and/or platform. For example, an ORB application may include different sets of instructions for providing an interface, where each set of instruction is written in C, C+, C++, JAVA and PERL. Furthermore, ORB applications may be scaled down for particular devices. For example, devices with limited hardware or small form factors may receive a minimal set of instructions. Lastly, the interface provided by the ORB applications may be configured to provide browser-compatible data or content. In this way, certain devices, such as small cell phones that are web-enabled, may access and view some data or content generated by individual satellites without having to execute an actual ORB application.

For third-party network accounts and resources that the user or community wish to make part of the personal network, the user may specify network locations and information necessary for accessing and using those resources. For example, the user may provide a HOTMAIL email address, including log-in and password information, an APPLE iTUNES login and password, and a YAHOO! PHOTOS login and password. In an embodiment, a web-service may be provided in conjunction with the ORB applications. Part of the functions of the web service may include communicating the third party information for a particular user to one or more satellites or services on the personal network. Alternatively, the web service may retrieve the content (e.g. emails, MPEG files and photographs) for the user's personal network, and deliver the content to specific memory locations on the user's personal network.

Example Usages of Personal Network

The following are examples of how satellites may combine to provide services and interconnect the heterogeneous elements of the personal network. Various other examples will be described in greater detail with additional embodiments described below.

Figure 6:
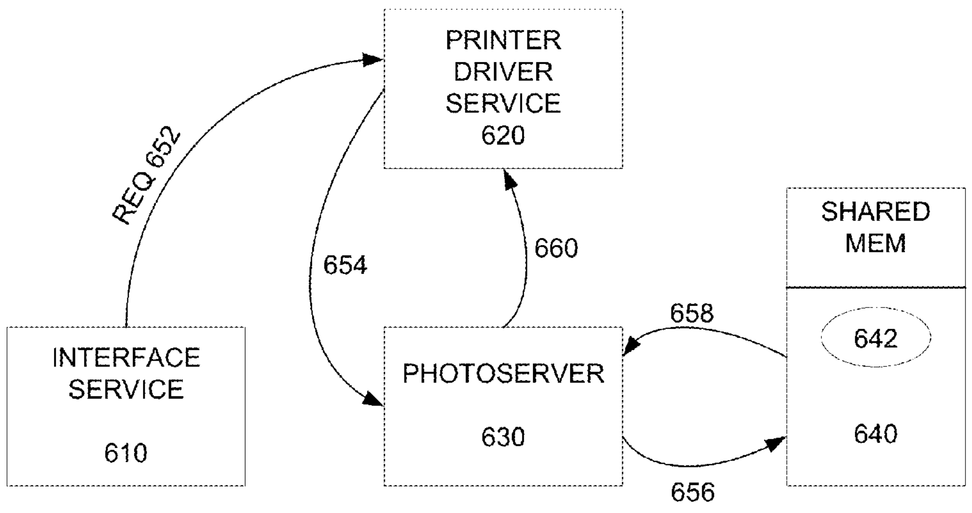
FIG. 6 provides an illustrative example of an embodiment of the invention.

In FIG. 6, the use of three services is described as an illustrative example of how an embodiment described herein may be implemented. In FIG. 6, the services provided on the personal network include an interface service 610, a printer driver service 620, and a photo server 630. The three services may be combined in order to enable a user to print photographs. The interface service 610 may be configured to enable the user to select, and possibly view a list of available photographs, and also to instruct the personal network to print selected photographs at a printer of the printer driver service 620. By selecting the file using the interface service 610, the user may also specify file location and/or location of the file. Using the interface service 610, the user may also provide or indicate the command of "print" for one or more selected items. Entry of the command causes the interface service 610 to pass a request 652 that identifies a file 642 of the user's selection to the printer driver service 620. In turn the printer driver service 620 references its own data structure to identify the service that is capable of locating the requested file 642. In the example provided, the printer driver service 620 would identify the photo server 630 as being the appropriate service or satellite. A request 654 would be forwarded to the photo server 630, which in turn would send a communication 656 to a shared memory 640 in order to retrieve file 642. The photo server 630 receives a response 658 corresponding to the file 642 from the shared memory 640 and delivers a copy 660 to the printer driver service 620. In locating the file 642, the photo server 630 may use an identifier and possibly a location provided for the file by the user. The printer driver 620 rasterizes data retrieved by the photo server 630 and causes the associated printer device to make a hard copy of the file 642. The printer driver then makes a request 654 to the photo server 630 for the photo server to make a request 656 that specifies a file 642 from a shared memory 640. Upon the items being printed, a communication may be provided from the printer driver service 620 to the interface service 610 indicating completion of that particular print job.

The flexibility of the personal network, as devised herein, enables the personal network to provide services such as the interface service 610 at numerous locations. For example, the interface service 610 may exist in multiple forms for different devices and/or operating systems. For example, the interface service 610 may be configured to be presentable as an application for use with a user's connected PDA. To this end, the interface service 610 may be configured to receive input from the PDA. The input may, for example, be a text entry, touch selection or voice command. Alternatively, the interface service 610 may exist on or through a web-site or other network site available through the Internet. In either case, the interface service 610 may have knowledge of the different satellites and their capabilities. This knowledge may be received from announcements of the repository, such as shown by FIG. 4.

In another embodiment, the interface service 610 is distributed amongst the web-service and multiple satellites residing on different devices of a given personal network. In such an embodiment, the user may be able to select from the web-based portion of the interface service 610 the locations from which the interface service 610 is to be made active. Once made active, the user may access the interface service 610 from that location.

Other examples of the cooperation and interoperability of satellites may be provided. In one example, a service may automatically access and/or receive digital pictures on the digital camera and make the images available to all devices that are capable of viewing images. Another service may correspond to a printer driver that interfaces with the printer to print the images. Access to view the images, to control the camera into taking pictures, to cause the pictures to be made available on the personal network, and to edit the pictures may be provided from any location that can access the personal network. In an embodiment, access to the personal network may be provided over the Internet, or from the PSTN system.

Another service may enable selection of different media sources as channels. For example, real-time video captured by the camcorder may be one channel, cable feed may be another channel, and the user may select which channel they wish to view. Extending the example further, another service may transcode the different media feeds for different devices. For example, media from the media feeds may be transmitted from the media center to cell phone, PDA, and the public network domain 504. Depending on the bandwidth, processing resources, display size and resolution, audio capabilities, and/or memory of the destination, the transcoding service compresses and reduces resolution of the media feed based on the destination.

Linked Memory

Embodiments allow for memory devices and resources available on a personal network to be linked so as to form a combined memory. The combined memory may have the appearance of being a single memory medium, when in fact the memory devices and/or resources may be distributed throughout the personal network. The locations of the memory resources and devices may extend to multiple devices residing at multiple locations on a local area network, to memory devices that are coupled to the personal network across the Internet or other public network, and to memory resources provided on third-party sites, such as on web portals. Moreover, embodiments described herein allow for the memory devices and resources to operate on different platforms or operating systems.

Figure 7:
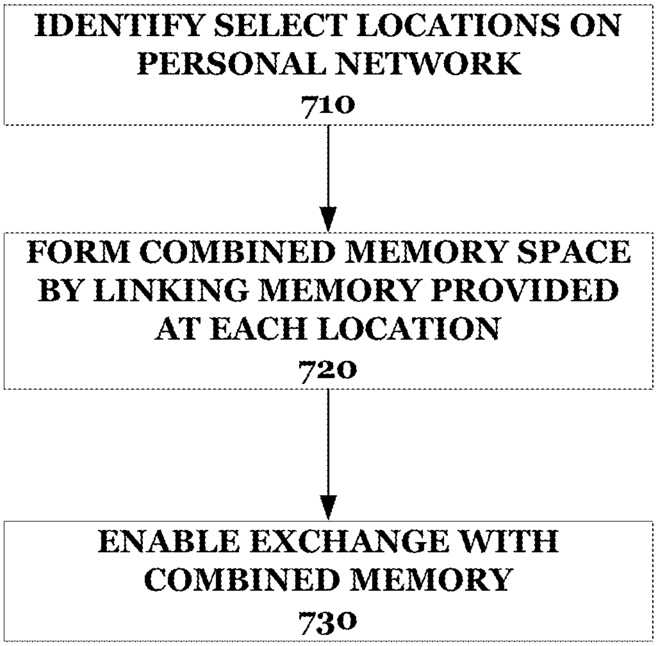
FIG. 7 illustrates a basic method illustrating how linked memory resources on a personal network may be used, according to an embodiment.

FIG. 7 illustrates a basic method illustrating how linked memory resources on a personal network may be used, according to an embodiment. In step 710, the locations of memory resources on the personal network are identified. These locations may, at least initially, be identified by designations of the user. For example, the user may specify certain memory components that are under his control or use, and for which the user wishes to make available for use on the personal network. The locations may, for example, correspond to portions of a home computer system, a media center, a connected appliance (e.g. digital camera or camcorder), an Internet memory account (e.g. YAHOO! PHOTOS), and a work computer which is accessible over the Internet or some other data network. In one embodiment, the portions of memory identified may correspond to a branch or segment of a directory structure, including nodes on which files and other items are provided.

In step 720, a combined memory space is formed by linking the memory associated with each of the locations identified in the previous step. The memory resources may be linked by making the memory accessible to one or more satellites (or services) that are cooperatively coupled to one another. In one embodiment, satellites interconnected in a manner described with FIGS. 1, 2A and 2B may be considered cooperatively coupled, and memory resources made available to those satellites would therefore be linked. In a scenario where a user establishes a personal network with several ORB-enabled satellites, the user may establish the combined memory using memory resources associated with individual satellites. Memory resources associated with individual satellites may include memory, including portions of a device memory (e.g., personal computer hard drive, removable memory in a laptop, flash memory in a PDA or memory stick) in which content, data and other items are stored. Such memory resources may be structured in the form of a directory. In one example, a user may select media folders on the hard drive of a personal computer, photographs stored on a PDA, media files stored on a local drive of a work computer, and so forth.

Step 730 allows for exchanges to occur between satellites, and/or locations having access to the personal network, and the combined memory. For example, embodiments of the invention allow for a user to store and/or retrieve content, files, documents and other item from any device that is a satellite in the personal network. This may correspond to any device on which ORB-enabled applications or interfaces are provided. In an embodiment, a web-based service may access portions of the combined memory to retrieve content and other items. One embodiment provides that the content and other items are converted into a format that is viewable from any device having a browser (or other component capable of viewing documents and items in a markup language format). Thus, for example, embodiments enable exchanges to occur between the combined memory and remote Internet sites.

Figure 8:
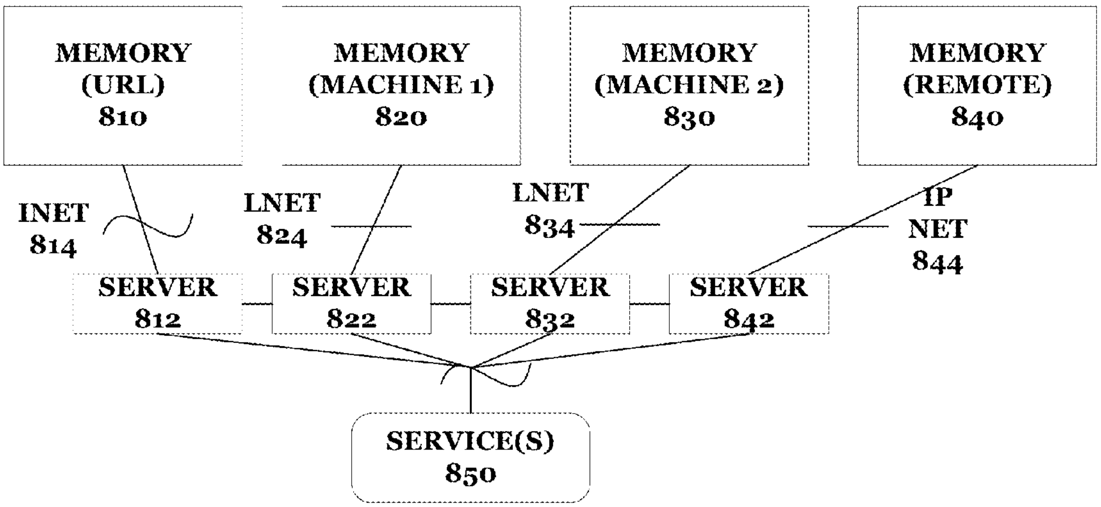
FIG. 8 illustrates a system for forming and using a combined memory, under an embodiment.

FIG. 8 illustrates a system for forming and using a combined memory, under an embodiment. The system includes a plurality of linked memory resources, including a first memory 810, second memory 820, third memory 830, and fourth memory 840. Each memory is coupled to one or more servers in a cluster of servers on the personal network. As shown, a first server 812 is provided for first memory 810, second server 822 is provided for second memory 820, third server 832 is provided for third memory 830, and fourth server 842 is provided for fourth memory 840. The servers may each be software based, and can reside on one or more machines. However, the servers 812, 822, 832, 842 may each include an API that interconnects that server to one or more other satellites on the personal network, including to a repository 850.

For purpose of description, the first memory 810 is an Internet memory resource, such as provided by portals, and on Internet email accounts. A network connection 814 may include the Internet. The first memory 810 may, for example, be located by a uniform resource locator (URL). The second memory 820 and third memory 830 may be coupled to the personal network using LAN connections 824, 834 respectively. The fourth memory 840 may be located on yet another machine or machine resource, but at a separate network domain. For example, the fourth memory 840 may coincide with a portion of the hard drive belonging to the user's machine at his work. The fourth memory 840 may be accessible to the server cluster of the personal network across using a public network connection 844, such as the Internet. Its location may be identified by an IP address. A URL or other mechanism may be used to locate the fourth memory 840.

Individual servers in the server cluster may be dedicated to retrieve, modify, and delete content, files and other items based on a data type of the file or item being retrieved. As an alternative, or additional level of operation, individual servers in the server cluster may be assigned to specific memory resources or locations. Thus, the individual servers may retrieve, modify, delete and add items/content to assigned memory resources, or regions of specific memory resources. For example, first server 812 retrieves files from the first memory 810. Each server may be assigned to retrieve files and other items from a specific memory in the combined memory. Still further, other embodiments may, as an alternative or additional level of operation, provide that specific servers retrieve files based on other factors, such as the directory location of the files in respect to the location of other files.

The cluster of servers may be made available to one or more services 850 (as provided by individual or combined operations of satellites) on the personal network. In one embodiment, the cluster of servers is seamlessly integrated with the services of the personal network. The satellite or service may therefore use the linked memory resources as if the memory resources where combined and residing on one machine, as one resource. In an embodiment shown by FIG. 9, the server clusters perform operations in response to requests from different services. These operations may include the retrieval of files, documents and other items. In one embodiment, an operation requiring use of the linked memory may be performed without the user having to specify the location of the memory resource. For example, the user may perform the operation without taking any separate action to specify the actual location of the item (such as identifying a directory path of the item). When a request to perform an operation on an item is received by the cluster of servers, one of the servers in the cluster may retrieve the item from the portion of the linked memory that it is assigned. In one implementation, each server may attempt to locate the requested item based on an identifier of the item, and the server that does locate the item returns the item to the requesting service. In another implementation, each server recognizes from the identifier whether the item is in that server's real of operation. For example, only first server 812 may retrieve MPEG files. A request for retrieval of a specific MPEG file may therefore be handled by first server 812. The first server 812 may check one or more memory resources in retrieving the desired files, but the first server 812 may also have knowledge on where to look for that particular file. Examples of operations that may be performed using the linked memory resources include operations to store items, to read items, and to edit or delete items. In one embodiment, the operation and the item may be specified, but the location of the memory resource where the item resides may be of no relevance, at least to the user. In such a scenario, a user's specification of the operation and item is all that is necessary for the cluster of servers to locate the item and perform the operation. Thus, the aspect of locating a particular item, or a particular location in the linked memory, may be automated, or at least made independent of the fact that the memory resources may be distributed on multiple machines and across multiple network domains.

Various types of services are contemplated for a system such as shown in FIG. 8. A service includes one that renders images or plays back audio and/or video media. Such a service may use the cluster of servers to retrieve image/media files for consumption by individual satellites and/or devices that are interconnected on the personal network. Another example of a service that can use the linked memory includes a server that captures media (such as audio, video, or image) and stores the media at a designated location in the combined media. In the latter scenario, the user may specify an address or location on which the captured file is to be stored by making reference to the combined memory. But the steps of locating the actual media resource are done automatically, even though several media resources on different locations and network domains may exist on a given personal network. In this way, the combined memory may be viewed and operated as a single memory resource or entity.

A search service may also be provided for a system described in FIG. 8. The search service may enable a user to enter a search term on a connected device. The search term may be matched to identifying features of files, documents and media stored on the different memory locations. One or more servers 812, 822, 832, 842 may be used to inspect the identifying features of the items in the memory sources.

Alternatively, a database or other data structure may store identifying features of items in the memory sources. A combination of servers may populate such a database. Search terms provided by the user may be compared against the database for matches. For example, a search string specified by the user may be matched to metadata associated with media files.

Figure 9:
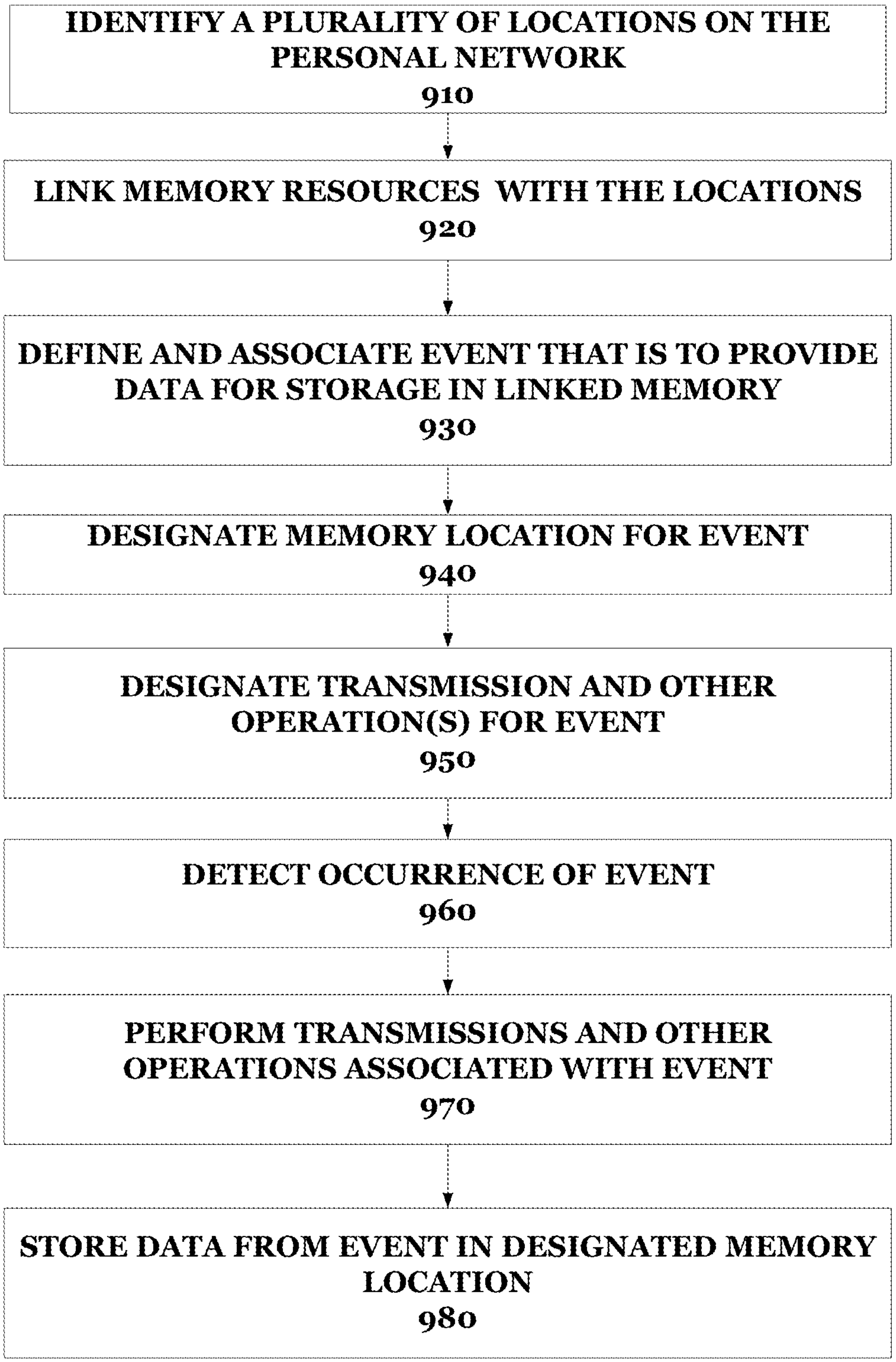
FIG. 9 is a method to link memory from different locations of a personal network, and to associate actions with specific portions of the linked memory, under one embodiment of the invention.

FIG. 9 illustrates a general application for a combined memory formed from linking memory resources located at different locations. An application such as illustrated in FIG. 9 enables for items to be added to a combined memory of a personal network.

In step 910, a plurality of locations on the personal network are identified. Each location has an associated memory resource. As described in FIG. 8, the memory resources may reside on a local domain, on the Internet and/or at a remote location.

Step 920 provides that a combined memory is formed from linking the memory resources associated with the locations identified in step 910.

Step 930 provides that an event is defined that is to result in data being generated and stored in a designated memory location. In one embodiment, the event may be defined for a specific device or satellite. The manner in which the event is defined may be numerous, and configurable by the user. Embodiments of the invention provide that the event corresponds to an action taken by or on a specific set of satellites, or devices on which the satellites execute.

In step 940, the designated location for storing data from the event is identified. The designation may be made in reference to the combined memory. But the location in the combined memory may actually reside on one of the memory resources that form the combined memory. However, the actual location may be hidden, or represented in some an alternative manner to reflect the linking and combined nature of the memory resources.

In step 950, transmission and other operations are defined for data generated from the associated event. This may include operations that cause the data to be transferred to the identified location. Performing this step may require configuring the satellites (or devices on which they reside) to detect the event and to perform one or more additional operations, such as copying data and transmitting copied data to servers from which the data may be stored and subsequently retrieved from the specified memory location.

In step 960, the occurrence of the event is detected. For example, the event may occur to the performance of an action by a specified satellite or device.

In step 970, additional operations that are to be performed upon the occurrence of the event are performed. Then in step 980, data generated for or by the event is transferred and stored in the associated location of the combined memory.

Several applications may be implemented using a method such as described in FIG. 9. In one embodiment, the event may correspond to a roaming device capturing a digital image. For example, a method such as described in FIG. 9 may be applied to a cellular phone with digital camera functionality. The event defined in step 930 may then correspond to the camera application capturing an image, or even to the cellular phone receiving a captured image (e.g. the cellular phone receives an image file from another cellular phone via email, SMS, attachment, infrared etc.). For step 940, images captured on the cellular phone may previously be designated for a particular memory location. For example, the user may specify the location of YAHOO! PHOTOS for all digital images captured by that users cellular phone. In step 950, the additional operations may correspond to an application or configuration that would cause the cellular phone to automatically transmit the data corresponding to the captured image to the personal network using a cellular network. For steps 960 and 970, when the image is captured or received, the transmission of the data corresponding to the image may be initiated. Step 980 is performed by one of the servers on the personal network transmitting the data corresponding to the image to the user's YAHOO! PHOTOS account.

Numerous other examples may be determined requiring some or all of the steps recited in FIG. 9. For example, a method such as described in FIG. 9 may be extended to a voice or audio recording capability on a roaming device, such as a WIFI enabled PDA. Audio recordings captured on such devices (or anywhere else) may be designated for storage on one of the memory locations associated with one or more of the satellites in the personal network. When a voice or audio recording is received, the PDA may be configured to use the WIFI connection to transmit the data corresponding to the recording to the personal network, where the recording may be stored at the designated location.

Viewer for Combined Memory

Figure 10:
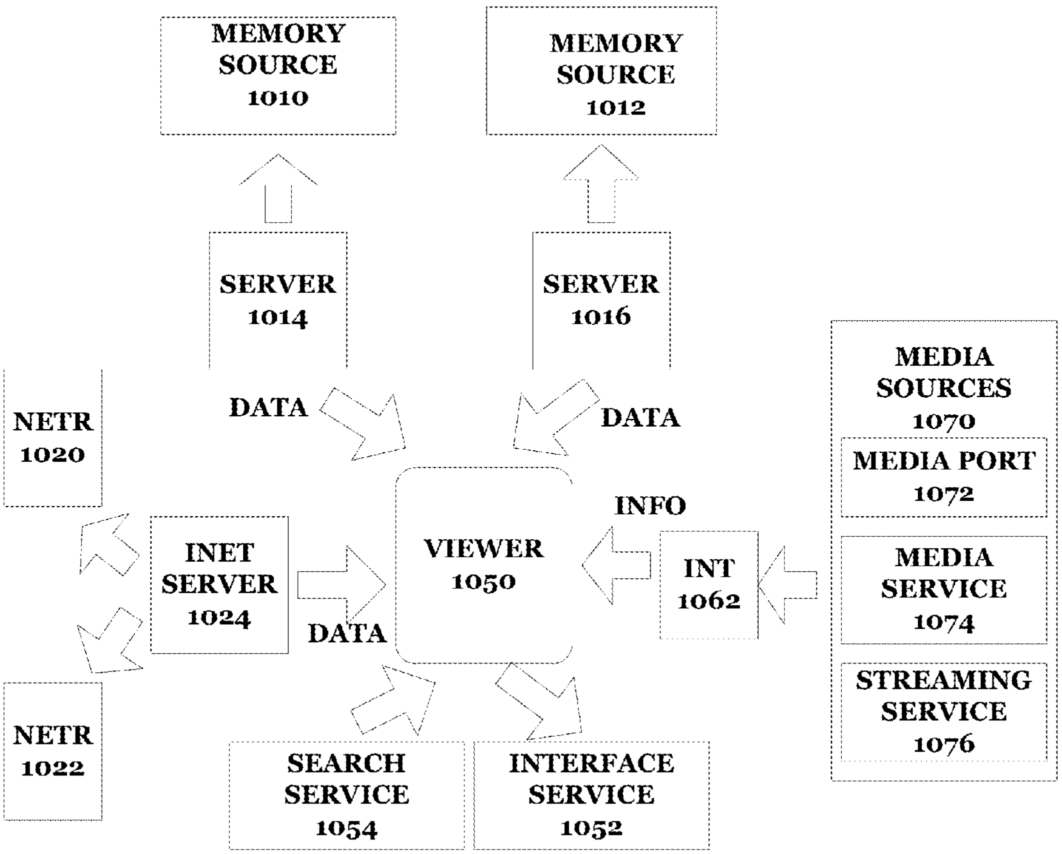
FIG. 10 illustrates a system for presenting contents of memory resources on a personal network, under an embodiment of the invention.

FIG. 10 illustrates another embodiment in which a combined memory may be formed in order to provide a viewer of content in the multiple memory resources that form the combined memory. The viewer enables the user to combine various sources of information, including information from sources not included in the memory resources. For example, the user may create lists of content items using content listings in the combined memory, in combination with content listing from one or more external, non-personal network items.

In FIG. 10, a system is provided that combines data from different sources for a viewer 1050. The viewer 1050 corresponds to a data structure that contains data representing the contents of the different memory sources that form the combined memory. Examples of such data structures include text metadata (such as file name) and thumbnail views of files. In addition, an embodiment provides that the viewer 1050 presents data representing content and media from sources other than the combined memory.

The combined memory may include first memory source 1010, a second memory source 1012, a first network memory resource 1020, and a second network memory resource 1022. The first and second remote memory resources 1020, 1022 may correspond to, for example, Internet storage accounts, such as those provided by email services. A first set of one or more servers 1014 may perform server operations for the first memory source 1010, and a second set of one or more servers 1016 may perform server operations for the second memory source 1012. In addition, one or more servers 1024 may be provided for the first and second remote memory resources 1020, 1022.

According to an embodiment, each of the sets of servers 1014, 1016, 1024 perform read operations to scan the content items in their respective memory domains. The read operations may be performed automatically, such as periodically or according to a schedule. In one embodiment, the sets of servers 1014, 1016, 1024 retrieve information that includes the names of content items in the respective memory sources 1010, 1012, 1020, 1022. It is also possible for the sets of servers 1014, 1016, 1024 to each retrieve metadata from those content items. Examples of the metadata include the size of the file, the dates in which the files or items were modified or created, and the format of the data in the file or item. In an embodiment, it is also possible for the sets of servers 1014, 1016, 1024 to retrieve content or payload data from the items in their respective domains, either for all of individual items or portions thereof. The information read from the different memory sources is provided to the viewer 1050. The viewer 1050 may correspond to a data structure such as a table or directory. In one embodiment, select information from the operations performed by the sets of servers 1014, 1016, 1024 are presented to the user. The information may be provided as a table, or in an interface where multiple pages are provided. Features such as icons or menus may be used to access and view more information about select items.

It is also possible for the information contained in the viewer 1050 to be hierarchical in nature. For example, the viewer 1050 may present information in a directory format, where nodes in the directory correspond to memory resources 1010, 1012, 1020, 1022. The arrangement of the nodes in the directory may be determined by the user. In addition, the viewer 1050 may be provided as hierarchical interface where users may use features such as selectable icons and pull-down menus to view information retrieved from the sets of servers 1014, 1016, 1024 in some hierarchical fashion.

In addition to content items from the combined memory, the viewer 1050 may be used to show information about content items from one or more media sources 1070. For example, a media service 1074 (cable or satellite media), a media port 1072 for receiving broadcast media, and a streaming media service 1076 from the Internet may be accounted for in the viewer 1050. In one embodiment, an interface 1062 used to gather information about select media provided from the different sources. For example, interface 1062 may be used to present schedule information from the different media sources on the viewer 1050. As another example, the interface 1062 may read guide information from a website or television screen to view when select programs are to be provided from a given source. The schedule information may correspond to what is made viewable on the viewer 1050. In this example, the user may sort or select from the guide information that is made available for display in order to view schedule information for media programs of interest. Once the user has configured the schedule information to his preferences, he can specify the schedule information (via a graphic user interface) to be available for viewing from select or all satellites in the personal network. The user may even go outside of the satellites and make the schedule available on, for example, an Internet account or a non-satellite roaming device.

Data contained in the viewer 1050 may in turn be provided to other services that form the personal network. In an embodiment shown by FIG. 10, the other services include, for example, an interface service 1052 and a search interface 1054. The interface service 1052 formats a presentation of the viewer for display on one or more types of display platforms. For example, the interface service 1052 may provide a presentation to accommodate the capabilities and features of a cell phone or web page. In one embodiment, the search interface 1054 enables users to search for items, including files, media, media sources, and documents, based on identifying information that is retrieved from those items and provided in the viewer 1050. The identifying information may include, for example, file names, media name, and data types.

In an embodiment, the user of the personal network may configure a presentation of the viewer to display various items and media in anyone of a number of ways. A user may configure separate interfaces for different kinds of media, documents and files (e.g. radio media, music files, video sources, email etc.) to display the contents of certain segments of memory or select sources of media and/or data. The user may also order the items being presented on an interface, and select the representations of items (e.g. directory names or icons). Various other forms of configuration are also possible.

One purpose of viewer 1050 is to organize the presentation of content and items that the user may wish to have readily available when accessing the personal network from a satellite or roaming device. The viewer 1050 then provides an updated view of the media and content available to a user from his personal network. In addition to providing an updated view, the viewer 1050 enables users to select media or items for consumption from one of the satellites or roaming devices. In other words, the items presented by a viewer on a given interface may be selectable by some user-action. Once selected, the item may be retrieved and delivered to the satellite specified by the user. This satellite may correspond to a device that the user is using to connect to the personal network. Alternatively, the satellite on which consumption occurs may correspond to another location remote from the location of the user. For example, the user may request a media file to be played back on his home computer from a location at work.

Live Views

An embodiment enables a personal network to provide the most updated views of all data items in the personal network to all nodes on the personal network. In one embodiment, each device on the personal network that has browser capabilities can access and view the contents of viewer 1050. The viewer 1050 may maintain a view of each item in its most updated form. In addition to media files, items that can be maintained in the viewer 1050 include records (such as tasks and calendar information), messages (email or voicemail), and documents (word document). By providing the most updated view of each such item, embodiments provided herein reduce or even obviate the need to "synchronize" files. For example, a PDA may carry in the personal network a view of the calendar records on a personal computer. No local copy is needed. Any edits made to the view of the record on the PDA are transferred to the location of the actual record, where the change is made.

Interfaces

Figure 11A:
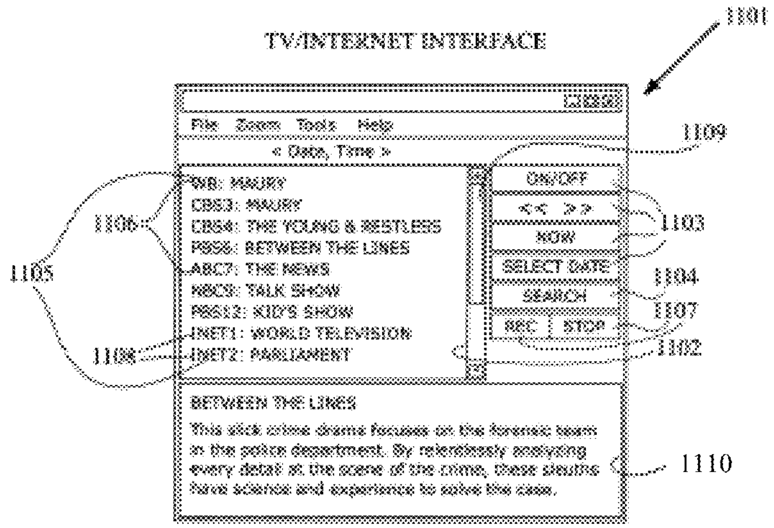
FIGS. 11A-11G illustrate various user-interfaces for use with embodiments described herein.

FIG. 11A-11G illustrate examples of interfaces for displaying contents from the viewer 1050. FIG. 11A illustrates an example of an interface 1101 for displaying sources, titles (and other information) and/or schedules of audiovisual media feeds. In contrast to program listings such as provided with cable television, an embodiment described herein lists audiovisual media feeds from numerous sources. Examples of audiovisual media feeds (referred to as "programs" for simplicity) include cable or satellite television programs, live webcam feeds, and Internet television. With reference to FIG. 11A, a window 1102 may contain a list, or a partial list, of programs 1105 at a given instance of time. The programs 1105 may include cable programs 1106 and Internet television programs 1108. Webcam feeds may also be provided. A scroll bar 1109 may be provided to enable the user to scroll and view different programs. The programs listed are each available to the user from the personal network at a particular time. The user may select one or more times (e.g. right now, or at 8:00 PM) on which the list of programs are to be shown. Thus, the list of programs in the window 1102 may provide schedule information and/or current information, and also audiovisual media feeds from multiple sources. While the user's input may determine what channels or program information is displayed, the user may input information other than a desired time. For example, the user may manually select programs or content feeds of choice. Alternatively, the user may select to view what programs are showing based on other sort criteria, such as title, genre (Comedy), channel, etc.

In an embodiment, the items listed in window 1102 are selected by the user. According to one implementation, the user may select items by interacting with the viewer 1050 (FIG. 10), for example, by using an interface service. Thus, the user does not have to include in his personalized listings programs or channels that he is not interested in. This is particularly advantageous when the user is using a device that has a small form factor, such as a cellular phone. The user can limit program listings for the particular interface to programs and other audiovisual media feeds of interest, thereby saving display space on the cellular phone, and limiting his interaction with the interface 1101.

A summary segment 1110 may be provided for interface 1101. In one embodiment, the summary segment 1110 corresponds to electronically published descriptions of programs from the actual media source. For example, the Guide feature on cable programs provided such published descriptions. As described in FIG. 10, the interface 1062 may read the Guide information from the media feeds when available.

The interface 1101 may include a set of interface items 1103 for enabling manipulation of the interface. The set of interface items 1103 include on/off, moving forward and backward in time, a "now" feature (to display programs on select channels at a current time), and another feature to enable date or time selection of programs. Additional features may be provided for the interface 1101. For example, the ability to select channels may be provided on the interface 1101.

In addition, interfaces provided from viewer 1050 may provide remote control functionality. As will be described with embodiments below, satellites may be used to control other satellites. The interface 1101 may provide interface features that serve to control another satellite. For example, a set of interface controls 1107 for controlling a digital video recorder (DVR) may be provided. The set of interface controls 1107 include individual features for directing the DVR to record or to stop recording. A search feature 1104 may also be provided to enable a user to search information provided in the window 1102.

Figure 11B:
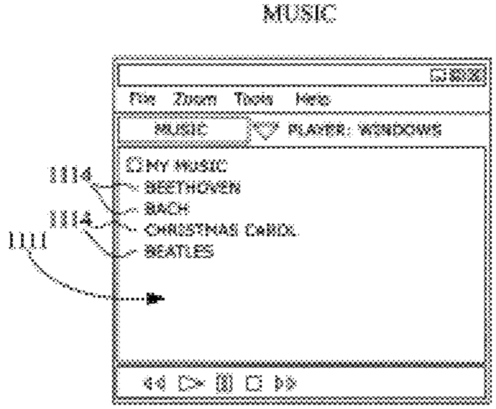

FIG. 11B illustrates an interface 1111 for displaying musical work and other audio based media of a user's personal network. As with an embodiment described above, the items 1114 listed in interface 1111 may correspond to a selected subset of the overall media provided on the personal network. While interface 1111 may list items 1114 on a common interface, the actual locations of the items 1114 may be on different machines and network items. For example, some musical items may be on a user's local machine, others with a third-party musical provided such as APPLE iTUNES. Furthermore, the interface may list items even though they have different file formats (e.g. MPEG and .wav) The manner of listing the musical media is shown as a directory or hierarchy, but other lists and organization formats may be used. Furthermore, the manner in which items are organized for display on interface 1111 does not have to correspond to the manner in which the items are organized in the actual memory sources, or even in the viewer. The user may select what items are listed. An embodiment also provides that the user may select the manner or format (directory, table, iconic, menu etc,) in which items are listed.

Figure 11C:
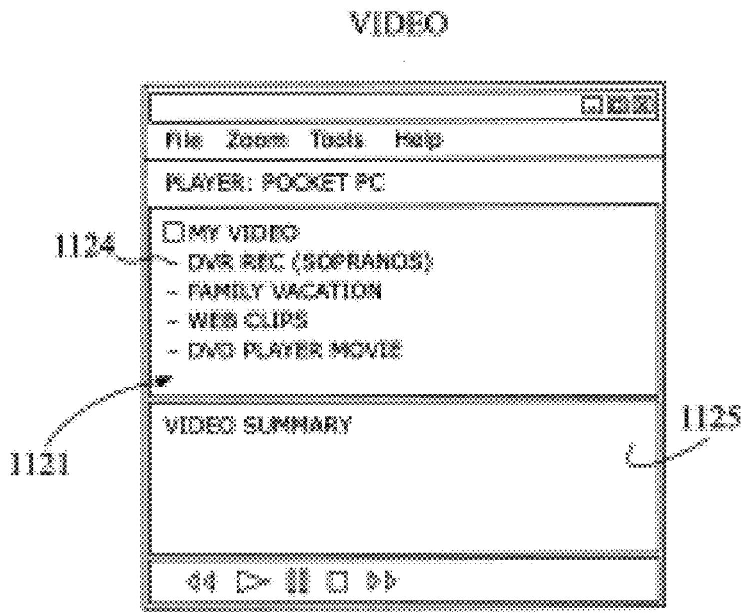

FIG. 11C shows an interface 1121 for displaying audiovisual files 1124, such as movies, television programs, home movies, and video clips. In an embodiment, these items may be displayed on a separate interface than audio files (see e.g. interface 1111), or the two types of media may be combined. In the example provided, video files corresponding to a DVR recording (TiVO), a family vacation recorded using a home video recorder, a web video clip, and a DVD movie are listed as the items 1124. In one embodiment, the interface 1121 (or any other interface) may provide a listing of the actual media device (DVD disc) on which a particular item is provided. For example, viewer 1050 may interface with a DVD player that is connected and available to certain services on the personal network. The media contained on the DVD player may be what is listed in the interface 1121. Interface 1121 may also provide a display area 1125 in which information about the media clip is provided.

Figure 11D:
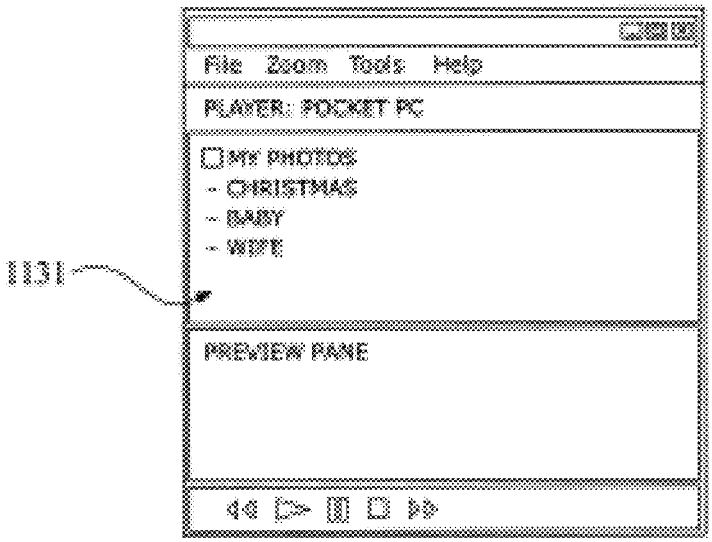

FIG. 11D illustrates an interface 1131 for a digital photo album that a user can maintain on his personal network. As with the other types of media, the actual locations of the photos may be scattered across various locations of the personal network. The photos may be selected from a larger set in appearing on the interface 1131. The interface 1131 may be used to display identifiers and/or links to photographs selected by the user. Selection by the user of the identifiers or links may initiate a service to display the photograph.

Figure 11E:
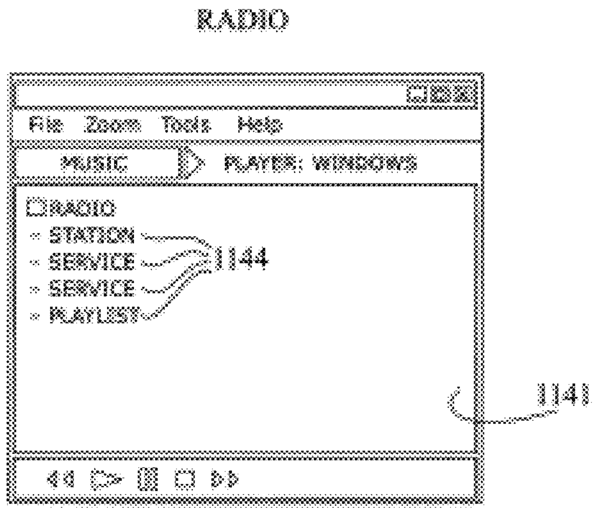

FIG. 11E illustrates an interface 1141 for radio type media. The interface 1141 displays different channels 1144 from which radio media may be received. The channels 1144 may be from different sources, such as FM radio, AM radio, satellite radio, cable radio, or the Internet. An embodiment such as shown enables a user to select channels from different sources for display on a common interface. The user may also select channels in order to listen to the audio media using interface 1141. Radio media may include broadcast audio media from radio stations, satellites, Internet stations, or other sources. Any device on the personal network that is capable of receiving radio feeds and storing the feeds digitally may be used in providing radio media content.

Figure 11F:
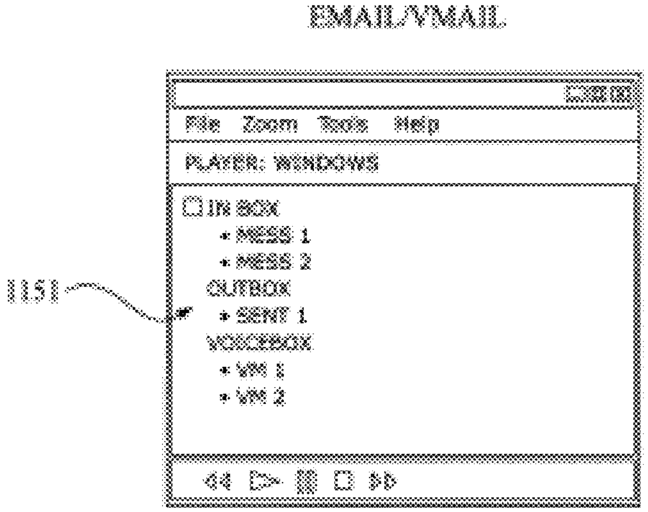

FIG. 11F illustrates another interface 1151 on which voicemail and email may be listed. This interface assumes that a satellite or a service exists on the personal network that can aggregate emails from one or more email accounts, as well voicemail messages, such as provided with IP telephony. Selection of items listed in the interface 1151 may cause the items to be opened, played back, or otherwise reproduced. In an embodiment, the type and location of the messages does not matter. As such, both voicemail and email from different accounts may be listed.

Figure 11G:
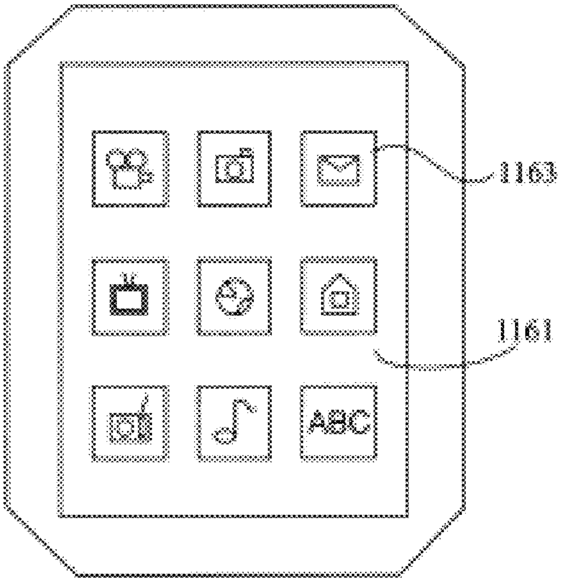

FIG. 11G illustrates a multi-pane display for a user-interface, according to another embodiment. A multi-pane display 1161 may be provided as a convenient mechanism for enabling a user to view and select a channel or file. The display 1161 may be provided on any satellite having sufficient display resources. While an embodiment such as shown in FIG. 11G has nine panes, other embodiments may have more or fewer panes. Selection of one pane may cause a resource associated with the selected pane to be retrieved and opened. While the resources associated with the panes are presented on one interface, the actual locations of the resources may be varied. For example, one resource may be located on a home computer, another on an Internet account. The resources may correspond to files (particularly media files), media feeds (cable television channels or web cam), individual satellites (e.g. printer or camera), and other resources of the personal network.

An embodiment provides that the panes 1163 are current on the status of the resource. For example, if an individual pane 1163 corresponds to a file, then deletion of the file may make the pane disappear from the display 1161. The panes may display thumbnails, corresponding to a sample of data retrieved from the individual resources associated with the panes. The thumbnail images may be updated (particularly in the case where the resources or media programs) to show the most current state (such as the current program being shown) of the underlying resource. Selection of resources underlying the individual panes 1163 may be iconic (e.g. double click with mouse-pointer, or single display tap on PDA).

According to another embodiment, portions of any of the interfaces shown in FIGS. 11A-11G, or items from each respective interface, may be combined or aggregated into one interface.

Remote Control of Components

Figure 12A:
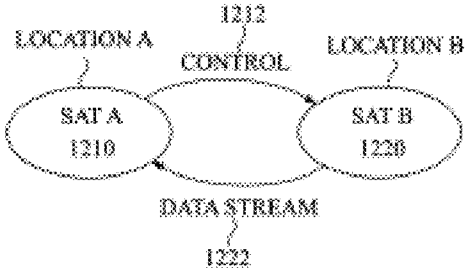
FIG. 12A illustrates a system for enabling one satellite to remotely control another satellite, under an embodiment.
Figure 12B:
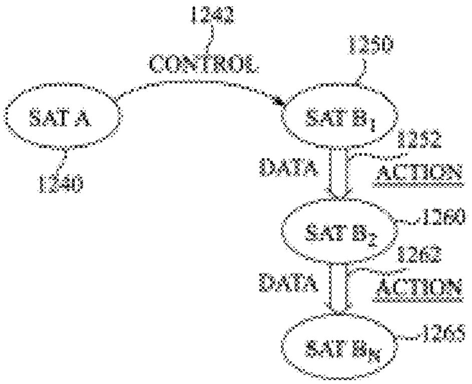
FIG. 12B illustrates a system for enabling one satellite to remotely control the use of data amongst a series of satellites, under another embodiment.
Figure 12C:
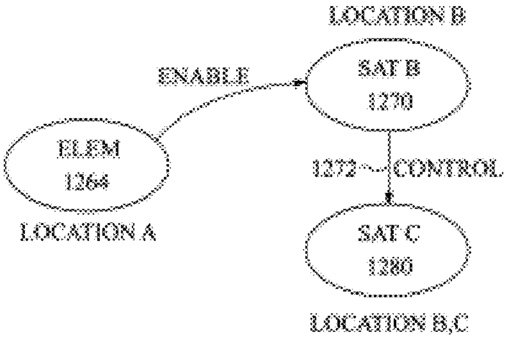
FIG. 12C illustrates a system for enabling one satellite to remotely control the application and use of data between two satellites in tandem, under an embodiment.

FIGS. 12A-12C illustrate different control applications in which one component may control other components through the connectivity of a personal network. In one embodiment, satellites on a personal network may be configured so that a first satellite can control a second satellite, even if the first and second satellites are remotely located from one another. Since each satellite contains an API or interface (see FIGS. 2A and 2B), each satellite can receive and process communications from other satellites. According to embodiments such as shown in FIGS. 12A-12C, one satellite can control another satellite using communications that pass over the personal network, regardless of the connectivity medium that connects that satellite to the personal network. Embodiments such as described below also provide that satellites can communicate and control/be controlled by other satellites, even if the other satellite has a different operating system, different platform and/or a different usage.

In FIG. 12A, a system is shown in which a first satellite 1210 causes another satellite 1220 to perform one or more operations. The first satellite 1210 may send control signals 1212 to the second satellite 1220. The control signals 1212 may be based on user-commands received on the first satellite. Data 1222 resulting from the second satellite 1220 performing the operations is streamed to the first satellite 1210. Thus, the second satellite 1220 may perform the operations, while the first satellite 1210 receives a resulting data stream 1222 from the second satellite's operations.

It is also possible for a non-satellite or quasi-satellite component to use the personal network to control other satellites and components. For example, a cellular device, with limited processing and memory resources, may be used to connect to and cause the playback of media files through a user's personal network. Data resulting from the playback may be streamed to the cell phone, so that the cell phone can reproduce the audio and media of the file. However, the playback of the source media file occurs at the location of the second satellite 1220. In the context of media playback, the terminal that is controlled to perform the original playback may alternatively be referred to as the originating terminal, while the other terminal is referred to as the receiving terminal. In an example provided, the second satellite may correspond to a media station or personal computer, which are systems that can access a very large media library. The cell phone is an example of a receiving terminal that has more limited access to a media library, because the cell phone may not have the same bandwidth resources, memory, or audio playback resources as the personal computer or media station. An embodiment such as described enables the cell phone to borrow the media library from another device or system. Furthermore, second satellite 1220 may know of the capabilities of the cell phone, and thus be able to stream data to the cell phone in a manner that allows audio output to occur on the cell phone. For example, the rate at which data is streamed may be configured to suit the bandwidth and/or processing resources of the cell phone. As an example, a full media output operation may be performed on the second satellite 1220 at the control of the cell phone, resulting in rich audio generation and possible video display. No user is needed on the second satellite 1220. But From the output of the second satellite 1220, a set of data may be streamed to the cell phone that enables the same media being played on the second satellite 1220 to be played on the cell phone. However, differences may exist in the audio generated on the cell phone, as compared to the second satellite. One difference may be that the compression used to send the set of data to the cell phone may be of a lower quality, since the cell phone may have lower graphic and audio equipment quality, processing speed, and/or bandwidth. Therefore, the quality of the audio output on the cell phone may be less than that of the second satellite.

In an embodiment, for a satellite or other component to be able to control other satellites remotely, the satellite needs to be equipped with capabilities that allow for it to be a controller. This may include the ability to process and send control signals, to process user-commands that are converted to control signals, and to receive resulting data as a result of the other satellite performing its operations. To this end, an embodiment provides that a controller satellite may be created for deployment on a personal network.

As mentioned, the result of the second satellite 1220 performing the operations commanded by the first satellite is that data is streamed from the second satellite to the first satellite. Streaming data 1222 means that the data is buffered and dispersed from the second satellite 1220 so that the data is continuously processed on the first satellite in a proper time sequence. In the case where data stream 1222 corresponds to audio and/or video media, the result is that the data stream can reproduce the audio and/or video media to replicate playback of the original media resource at the second satellite 1220. In streaming data, the second satellite 1220 buffers the data before sending it. The second satellite 1220 may initiate the stream operation, including the buffering of the data. Alternatively, the first satellite 1210 assists in performing the stream operation. Because the data is streamed, the data may be carried more efficiently and quickly, and received more richly. This compares to previous approaches to carry refresh data from an originating terminal to a recipient terminal. Refresh data usually corresponds to a snap shot of a visual presentation, such as a screen shot. When refresh and transmit operations are performed rapidly on the originating terminal, a video feel can be recreated on the recipient terminal. But this form of data sharing requires large amounts of data to be transferred, and the video feel is poor, since the refresh operations really only correspond to a series of snap shots. Also, audio data cannot be recreated with the refresh operation. The refresh and transmit operation offers little opportunity to configure the data transmission for the needs of the recipient terminal. For example, if the recipient terminal has a small screen, there is no opportunity to shrink the video media. In contrast, embodiments described herein enable the originating terminal (where second satellite 1220 resides) to configure the data stream for the recipient (cell phone or first satellite).

In addition to playback of audio or video files, other examples of applications for an embodiment such as shown in FIG. 12A include the following. The second satellite 1220 may receive live media, in the form of cable or satellite feeds. The first satellite 1210 may control the second satellite 1220, and other satellites as well, in directing the second satellite to forward data from the live feed to the first satellite, where it can be replicated. Additional description of such an embodiment is provided below. The second satellite 1220 may also correspond to an application that generates a document, such as a word processor. The control signals 1212 may initiate the second satellite 1220 to execute, thereby opening the document and streaming it (or portions thereof) to the first satellite.

The control signals 1212 may also be used to manipulate an operation of the second satellite 1220. For example, a user may interact with the first satellite 1210 in order to send a signal to the second satellite 1220 to manipulate a play-list, by for example, skipping a song or repeating it. As another example, the user may also interact with the first satellite 1210 in order to control edits or input into a document handled by the second satellite 1220.

While an embodiment shown in FIG. 12A illustrates data 1222 being streamed from the second satellite 1220 to the first satellite 1210, another embodiment provides that the data 1222 can be streamed to a third location, either instead of or concurrently with streaming the data to the first location. Thus, for example, first satellite 1210 can direct second satellite 1220 to stream data to a web-site, a roaming device or other location accessible to the personal network.

FIG. 12B illustrates an extension of a concept illustrated in FIG. 12A. In FIG. 12B, one satellite controls multiple satellites. In one embodiment, the satellites correspond to multiple applications, which may or may not reside at the same location. In an example provided by FIG. 12B, a first satellite 1240 is provided at a first location. A second satellite 1250 is provided at a second location, and a third satellite 1260 is provided at a third location that may or may not correspond to the second location. In an embodiment, the first satellite 1240 is configured to use control signals 1242 to control the second satellite 1250 and the third satellite 1260 independently of one another. Still further, an embodiment provides that an action 1262 of the third satellite 1260 that is controlled by the first satellite 1240 is conditioned on a corresponding action 1252 that is to be performed of the second satellite. The first satellite 1240 may control the second satellite to perform the action 1252, and the action 1252 may be used by the first satellite 1240 in causing the third satellite to perform the action 1262. The manner in which multiple satellites may be controlled from a common satellite in a cascaded or serial fashion may be extended to multiple satellites.

One application for an embodiment such as shown in FIG. 12B includes a roaming device (first satellite 1240) that connects to a personal network and direct a text document application (second satellite 1250) to retrieve a specified document. The text document application may correspond to a word application, a web-based text content retrieval application, or an email application. A user-input may specify, for example, what document is to be retrieved. Once the document is retrieved (action 1252), the document may be used by a text-audio application (third satellite 1260) to generate an audio output (action 1262) based on the contents of the document. The audio may be outputted at the location of the third satellite, or alternatively streamed to the location of the first satellite 1240. Still further, the audio may be streamed to a third or fourth one or more additional satellites 1265. A user may, for example, use his cell phone to direct a server on the personal network to retrieve a news item from the web. The cell phone may direct the server to send the document to a text-audio application, which then can convert the document into an audio file. The audio file may then be streamed back to the cell phone. Alternatively, the user may select another device to receive the audio file. For example, the user may use his cell phone to direct the audio file to be delivered from the text-audio application to a connected radio player in the user's car.

In embodiments such as shown in FIGS. 12A-12C, the controlling satellite may be able to control the other satellites despite the satellites being heterogeneous. For example, in FIG. 12B, the first satellite 1240 may operate on a device having one type of platform or operating system, while the second satellite operates on a second device having another platform or operating system.

FIG. 12C illustrates another embodiment in which an element 1264 of a network creates, designates, or otherwise enables a first satellite 1270 to send control signals 1272 to a second satellite 1280. In an embodiment, the element 1264 may correspond to a web-service, a browser-enabled device, or another satellite. For example, a user of the personal network may access the first satellite 1270 using a centralized web-service where users can establish their personal networks. A server or other machine may seek out the first satellite 1270 in order to enable that satellite to have control over the second satellite 1280. Once controller and controlled satellites are established, a system may operate in a manner such as described with FIGS. 12A and 12B.

Figure 13:
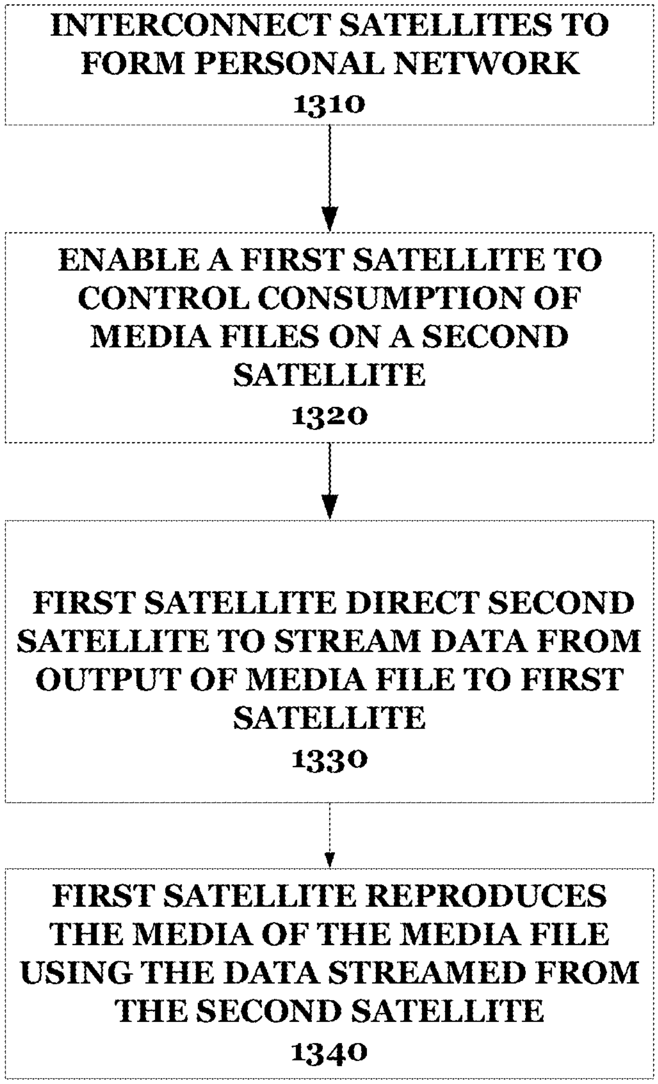
FIG. 13 illustrates a method for enabling a first satellite to receive a data stream from a second satellite, through the control of the first satellite, under an embodiment.

FIG. 13 illustrates a method in which a first satellite receives media data (such as audio data) from a second satellite that is directed to playback a media file containing the media data. In step 1310, satellites that are to form the personal network are interconnected. This may be accomplished in a manner such as described with FIGS. 1, 2A, and 2B.

In step 1320, a first satellite is enabled to control the consumption of media files on a second satellite. This step may include enabling the first satellite to access media resources on the second satellite, and to initiate the second satellite to perform operations of playing back the media files. The access to the media resources may also include the ability to enable a user on the first satellite to select a media resource on the second satellite.

In step 1330, the first satellite is also enabled to direct the second satellite to stream data corresponding to the media output to the first satellite. The second satellite may also be configured to stream the data generated from the playback to the first satellite.

Step 1340 provides that the first satellite reproduces the media of the media file using the data streamed from the second satellite. The first satellite may use a smaller application to playback the media, since the data for reproducing the audio has been streamed to the first satellite. The result may be that the first satellite and the second satellite both reproduce media from the media file concurrently. As such, both audio and video data may be reproduced at the first satellite, using an application that is executing on the second satellite, and a media file that also resides on the second satellite.

Transducer

Figure 14:
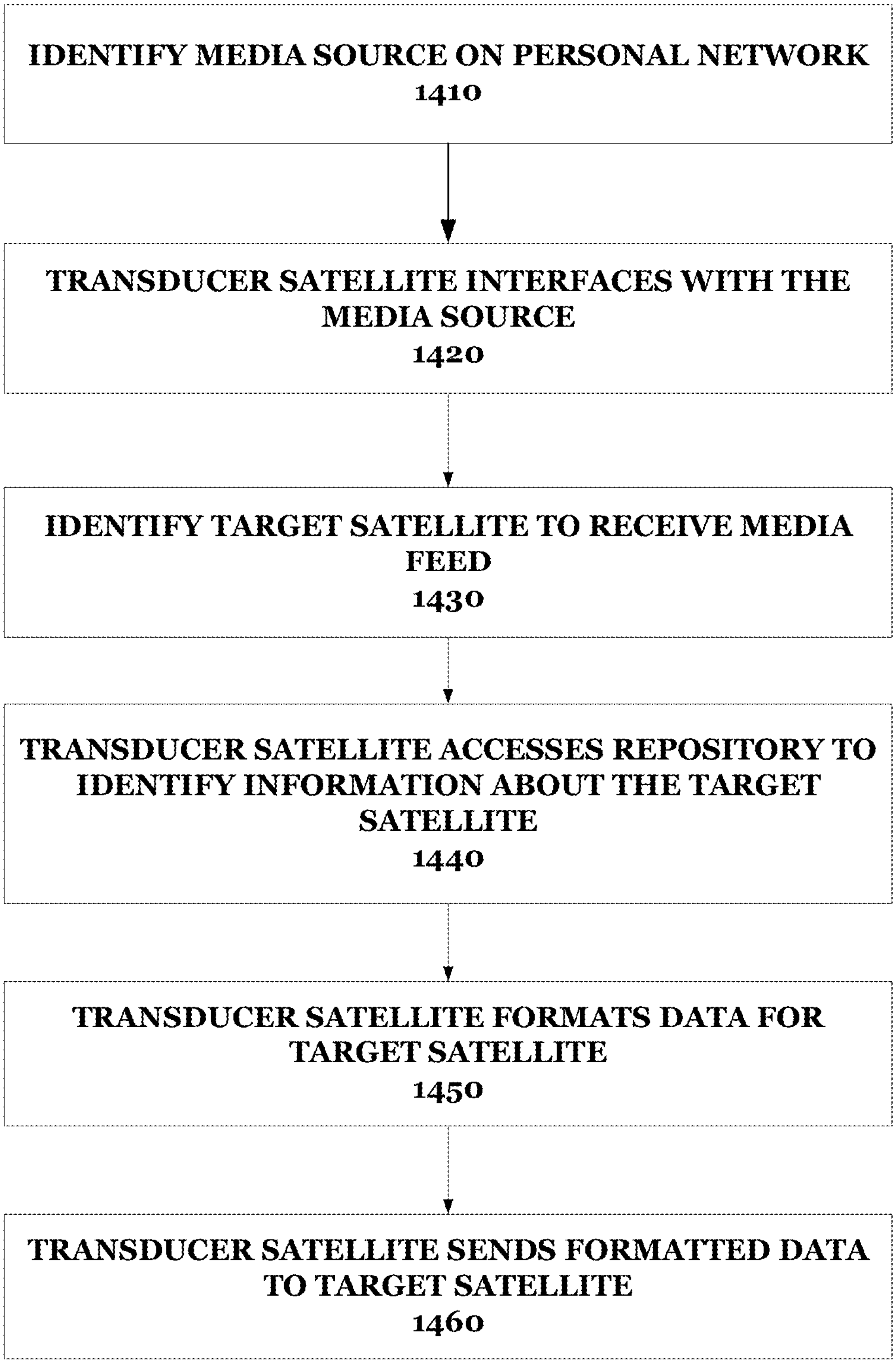
FIG. 14 illustrates a method for implementing a transducer on a personal network in order to transmit content to various kinds of devices, under an embodiment.

FIG. 14 illustrates an embodiment in which a satellite is provided on a personal network in order to provide a transducer service. The transducer service redirects streaming data that is sent to one location over to a designated satellite. A transducer service may be implemented on a media source such as a cable or satellite media feed, or a streaming event on the Internet. However, a transducer service may be implemented for any media file that can be streamed.

In step 1410, a media source on a personal network from which streaming media can be obtained is identified.

In step 1420, a transducer satellite interfaces with the media source. The transducer satellite may either interface with the media source directly, or interface with another satellite that provides the transducer satellite streaming media from the media source (see embodiments described with FIGS. 12A-12C).

In step 1430, the transducer satellite identifies a target satellite to receive the media feed. The target satellite may reside on a device, such as a roaming device. The identification of the target satellite may be specified by the user, such as the case where the user is operating the intended target device.

In step 1440, the transducer satellite accesses a repository (e.g. element 140 in FIG. 1) of the personal network in order to determine the capabilities of the target satellite, including the amount of data it can receive, and any information about the device that corresponds to the target satellite. The repository may make reference or contain a library with information that includes a data rate that the target satellite can handle (based on processing speed or bandwidth to the target), a display size or a display resolution. Other pertinent information about the device or platform of the target satellite may also be used.

In step 1450, the transducer satellite formats or otherwise prepares the data from the media source for the target satellite, based on the information it obtains about the device. For cell phone devices, as an example, the transducer satellite may reduce the resolution and format the streaming data to accommodate the specific display size of the target satellite or its device. In many cases, the transducer may also take no action, as the target satellite may have full capability to receive the stream with no modifications.

Step 1460 provides that the formatted data (if any) is streamed to the target satellite. The formatting of the media enables media resources from various sources, such as television or media files, to be formatted and delivered for instant playback on virtually any kind of recipient terminal, such as, for example, cell phones.

CONCLUSION

Although illustrative embodiments of the invention have been described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mentioned of the particular feature. This, the absence of describing combinations should not preclude the inventor from claiming rights to such combinations.

What is claimed is:

1. A method for using a personal network, the method comprising:

identifying a plurality of network enabled devices that operate as members of the personal network;

identifying a plurality of media sources provided by the plurality of network enabled devices, each of the media sources being remote to at least one of the plurality of network enabled devices;

displaying an aggregate presentation on a selected device of the plurality of network enabled devices by:

representing each of the plurality of media sources in the aggregate presentation to be independent of a network or memory location of that media source; and displaying information in the aggregate presentation about content that can be outputted from one or more media sources that are remote to the selected device;

enabling a user to select one of the plurality of media sources from the aggregate presentation and a target device to receive content from the selected media source; and outputting the content from the selected media source to the target device.

2. The method of claim 1, further comprising:

detecting a change in the media sources provided by at least the selected device; and altering the aggregate presentation to reflect the change.

3. The method of claim 2, wherein the change in the media sources includes a media source being added, altered or deleted from the selected device.

4. The method of claim 1, further comprising:

detecting a change in the plurality of network enabled devices; and altering the aggregate presentation to reflect the change.

5. The method of claim 1, wherein the plurality of media sources includes a plurality of media files.

6. The method of claim 5, wherein the plurality of media files include one or more media files which are stored in a local memory of the selected device.

7. The method of claim 1, wherein the plurality of media sources includes an Internet streaming source.

8. The method of claim 1, wherein the plurality of media sources includes at least one of a television reception source or a video camera.

9. The method of claim 1, wherein the plurality of media sources includes one or more of a set of images or one or more files containing recorded video and/or audio.

10. A non-transitory computer-readable medium that stores instructions, which when executed by one or more processors, cause the one or more processors to perform operations comprising:

identifying a plurality of network enabled devices that operate as members of a personal network of a user;

identifying a plurality of media sources provided by the plurality of network enabled devices, each of the media sources being remote to at least one of the plurality of network enabled devices;

displaying an aggregate presentation on a selected device of the plurality of network enabled devices by:

representing each of the plurality of media sources in the aggregate presentation to be independent of a network or memory location of that media source; and displaying information in the aggregate presentation about content that can be outputted from one or more media sources that are remote to the selected device;

enabling the user to select one of the plurality of media sources from the aggregate presentation and a target device to receive content from the selected media source; and outputting the content from the selected media source to the target device.

11. The non-transitory computer-readable medium of claim 10, further comprising instructions, which when executed by the one or more processors, cause the one or more processors to perform operations comprising:

detecting a change in the media sources provided by at least the selected device; and altering the aggregate presentation to reflect the change.

12. The non-transitory computer-readable medium of claim 11, wherein the change in the media sources includes a media source being added, altered or deleted from the selected device.

13. The non-transitory computer-readable medium of claim 10, further comprising instructions, which when executed by the one or more processors, cause the one or more processors to perform operations comprising:

detecting a change in the plurality of network enabled devices; and altering the aggregate presentation to reflect the change.

14. The non-transitory computer-readable medium of claim 10, wherein the plurality of media sources includes a plurality of media files.

15. The non-transitory computer-readable medium of claim 14, wherein the plurality of media files include one or more media files which are stored in a local memory of the selected device.

16. The non-transitory computer-readable medium of claim 10, wherein the plurality of media sources includes an Internet streaming source.

17. The non-transitory computer-readable medium of claim 10, wherein the plurality of media sources includes at least one of a television reception source or a video camera.

18. The non-transitory computer-readable medium of claim 10, wherein the plurality of media sources includes one or more of a set of images or one or more files containing recorded video and/or audio.

19. The non-transitory computer-readable medium of claim 10, wherein the instructions are for a set of applications that that are each executable on a particular computing platform in order to enable the user to establish the personal network.

20. A computer system comprising:

a plurality of network enabled devices;

memory resources provided by the plurality of network enabled devices;

wherein at least a selected device of the plurality of network enabled devices is operable to access a corresponding set of instructions from the memory resources to:

operate as a member of a personal network of a user;

identify a plurality of media sources provided by the plurality of network enabled devices, each of the media sources being remote to at least one of the plurality of network enabled devices;

display an aggregate presentation that represents each of the plurality of media sources to be independent of a network or memory location of that media source and displays information about content that can be outputted from one or more media sources that are remote to the selected device;

enable a user to select one of the plurality of media sources from the aggregate presentation and a target device to receive content from the selected media source; and output the content from the selected media source to the target device.

* * * * *